US012611855B2

(12) United States Patent
Lafferty et al.

(10) Patent No.: US 12,611,855 B2
(45) Date of Patent: Apr. 28, 2026

(54) APPARATUS AND A METHOD FOR BONDING WEBS OF NON-WOVEN PLASTIC MATERIAL

(71) Applicant: Dukane IAS, LLC, St. Charles, IL (US)

(72) Inventors: Justin Marshall Lafferty, Marshfield, WI (US); Matthew James Dittrich, Chagrin Falls, OH (US); Paul J. Golko, Crystal Lake, IL (US); Leo Klinstein, Glenview, IL (US); Matthew David Endres, Fond du Lac, WI (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 19/198,328

(22) Filed: May 5, 2025

(65) Prior Publication Data

US 2025/0289214 A1 Sep. 18, 2025

Related U.S. Application Data

(63) Continuation of application No. PCT/US2025/020281, filed on Mar. 17, 2025.

(Continued)

(51) Int. Cl.
*B32B 39/00* (2006.01)
*B29C 65/00* (2006.01)
(Continued)

(52) U.S. Cl.
CPC .............. *B32B 39/00* (2013.01); *B29C 65/08* (2013.01); *B29C 66/7294* (2013.01);
(Continued)

(58) Field of Classification Search
None
See application file for complete search history.

(56) References Cited

U.S. PATENT DOCUMENTS

| | | | |
|---|---|---|---|
| 6,547,903 | B1 | 4/2003 | McNichols et al. |
| 12,064,805 | B2 | 8/2024 | Krocker et al. |

(Continued)

FOREIGN PATENT DOCUMENTS

| | | |
|---|---|---|
| CN | 107053680 A | 8/2017 |
| DE | 10318485 A1 | 11/2004 |

(Continued)

OTHER PUBLICATIONS

International Search Report and Written Opinion for PCT/US2025/020281 mailed Jun. 12, 2025.

(Continued)

*Primary Examiner* — Christopher T Schatz
(74) *Attorney, Agent, or Firm* — ICE MILLER LLP; Justin D. Swindells

(57) ABSTRACT

An apparatus having a first treatment module and a second treatment module positionable in proximity to the first treatment module, wherein at least one of the first treatment module and the second treatment module includes a welding device for treating one or more workpieces. The apparatus has a controller arranged to: receive a real-time amplitude signal of ultrasonic vibration of at least one of the first treatment module and the second treatment module during a treatment cycle; segment the amplitude signal into a plurality of amplitude segments for the treatment cycle; monitor an amplitude value of each of the plurality of amplitude segments during the treatment cycle; operate a plurality of closed-loop control algorithms to determine a plurality of amplitude adjustment values, each of the plurality of amplitude adjustment values corresponding to a respective one of the plurality of amplitude segments; and apply each ampli- (Continued)

tude adjustment value to the corresponding respective one of the plurality of amplitude segments during the subsequent treatment cycle in real-time. The treatment cycle comprises treating a single workpiece in a plurality of workpieces, and the treating including a bonding operation, a welding operation, a soldering operation, a fusing operation, or a cutting operation.

18 Claims, 15 Drawing Sheets

Related U.S. Application Data

(60) Provisional application No. 63/566,757, filed on Mar. 18, 2024.

(51) Int. Cl.
B29C 65/08 (2006.01)
B32B 41/00 (2006.01)
G05B 13/02 (2006.01)

(52) U.S. Cl.
CPC ............ B29C 66/967 (2013.01); B32B 41/00 (2013.01); G05B 13/024 (2013.01); B32B 2310/028 (2013.01)

(56) References Cited

U.S. PATENT DOCUMENTS

| | | | |
|---|---|---|---|
| 2004/0011204 A1 | 1/2004 | Both | |
| 2008/0314498 A1* | 12/2008 | Lee .................... | B29C 66/73941 |
| | | | 156/64 |
| 2010/0276061 A1* | 11/2010 | Oblak ................. | B29C 66/9241 |
| | | | 156/73.1 |
| 2013/0112332 A1 | 5/2013 | Spicer et al. | |
| 2014/0338814 A1 | 11/2014 | Klinstein et al. | |
| 2015/0367440 A1 | 12/2015 | Dieterich et al. | |

FOREIGN PATENT DOCUMENTS

| | | |
|---|---|---|
| EP | 2106899 B1 | 5/2013 |
| EP | 3090859 A1 | 9/2016 |

OTHER PUBLICATIONS

Extended European Search Report issued in corresponding Europe Patent Application No. 25178260.3 mailed Oct. 10, 2025.

* cited by examiner

APPARATUS AND A METHOD FOR BONDING WEBS OF NON-WOVEN PLASTIC MATERIAL

CROSS REFERENCE TO PRIOR APPLICATION

This application is a bypass continuation of International Patent Application No. PCT/US2025/020281, filed on Mar. 17, 2025, which claims priority to, and the benefit thereof, provisional U.S. Patent Application Ser. No. 63/566,757, filed on Mar. 18, 2024, the entireties of both are hereby incorporated herein by reference as if fully set forth herein.

FIELD OF THE INVENTION

The present invention relates generally to nonwoven materials and, more particularly, to an apparatus, a system, and a method for treating one or more workpieces, including, but not limited to, a bonding operation, a welding operation, a soldering operation, a fusing operation, or a cutting operation.

BACKGROUND OF THE INVENTION

State of the art technologies are available for producing ultrasonically bonded cross seals, end seals or side seams on disposable undergarments made of nonwoven materials. However, those technologies perform poorly at high production speeds. For example, at production speeds above 175 to 200 units or articles per minute, the units or articles exhibit weak, uneven or inconsistent bonds. This poor performance is attributed in part to slow sample rates and response times of existing control systems with respect to both motion and ultrasonic performance. Typical sample rates in current PLC based systems are between a few milliseconds and 20 milliseconds. Moreover, the technology exhibits lower yields, inconsistent wear of metal parts, premature failure of components, and a need for operator configuration and parameter tweaking during production.

Typically, these bonds related to cross sealing occur in pairs, happening in rapid succession between comparatively long periods of unbonded material. The percentage of bonded material per product is very low, typically <5%. The first bond in each pair is part of product X and second bond in each pair is part of product X+1, corresponding to the left side and right side of each product. At high production speeds the existing state of the art fails to distinguish the individual bonds from each other. Critical process information is lost due to slow sampling rate, treating the two bonds as a single aggregated event.

Since the poor product quality at high speeds is due, at least in part, to leading bonds in resultant articles being weaker than trailing bonds, machine operators tend to compensate by increasing the bond force control parameter, often resulting in overwelded trailing bonds. However, this strategy produces greater force and stress on the machine. Reducing or eliminating overwelding allows the machine to last longer and to extend wear and tear maintenance intervals.

An ability to produce a consistent bond force between the leading and trailing bond can overcome these and other disadvantages, resulting in consistent bonds, higher product quality, higher yield, higher throughput, lower wear and tear, and no need for operator adjustment of any configuration or parameters. The instant disclosure provides a technology that provides consistent bonds with process improvements of six sigma quality levels, compared to state-of-the-art systems that can optimize the process to only about 3-4 sigma quality levels.

SUMMARY OF THE INVENTION

The instant disclosure provides a technology (including a system, a method, and an apparatus) for bonding nonwoven materials. The technology provides advantages such as, for example: bond strength variability of less than 10%; both sides (leading and trailing) of a bond being near equal, without any weak or uneven bonds; faster sampling rates, including taking an average of peak forces of each bond instead of sampling to peak force of multiple bonds; automated cycle rate detection without any need for external cycle rate feedback; actuator out of adjustment detection using, for example, dual encoder feedback; actuator over-travel detection; automated operator notification, including system status alerts such as maintenance required warning for mechanical actuation linkage; actual linear displacement of the horn; operability for intermittent bonding applications; and metal contact detection.

According to an aspect of the disclosure, an apparatus is provided having two or more treatment modules positionable relative to each other, wherein at least one of the treatment modules includes a joining device for treating one or more workpieces during a treatment operation. The apparatus comprises a controller arranged: to determine a force applied to at least one portion of each of the one or more workpieces during each bond in a plurality of bonds of the workpiece; analyze the measured force to determine a force characteristic value for each bond; calculate a force adjustment value based on the force characteristic value for at least one of the plurality of bonds; and apply the force adjustment value to at least one of the treatment modules. The treatment operation can include at least one of a bonding operation, a welding operation, a soldering operation, a fusing operation, or a cutting operation. The action of applying the force adjustment value to the at least one of the treatment modules can reduce bond strength variability.

In an embodiment the controller can be arranged for closed loop control.

In an embodiment the controller can be further arranged to: receive a force signal from a sensor that is indicative of the force applied to the at least one portion of each of the one or more workpieces during each bond, wherein the force is determined based on the received force signal; and adjust a position of one of the two or more treatment modules when the force adjustment value exceeds a predetermined threshold. The force characteristic value for each bond can be determined based on, for a predetermined period of time, at least one of: a peak of force values in the force signal; an average of force values in the force signal; a median of force values in the force signal; a range of force values in the force signal; a variance of force values in the force signal; and a standard deviation of force values in the force signal. The predetermined period of time can include a bond duration.

In various embodiments, the force adjustment value can be calculated based on at least one of: an average of the force characteristic values of two or more bonds; a median of the force characteristic values of two or more bonds; a range of the force characteristic values of two or more bonds; a variance of the force characteristic values of two or more bonds; and a standard deviation of the force characteristic values of two or more bonds.

In various embodiments, the controller can be arranged to: receive a force signal from a sensor, wherein the force characteristic value for each bond is determined based on the force signal; and determine a range of force characteristic values based on the force characteristic values for a plurality of bonds.

In various embodiments, the joining device can include an ultrasonic horn arranged to apply ultrasonic energy to the workpiece. The controller can be arranged to: receive at least one of an ultrasonic amplitude signal, an ultrasonic power signal, and an ultrasonic frequency signal; and calculate at least one of a bond period and a bond duration based on the at least one of the ultrasonic amplitude signal, the ultrasonic power signal, and the ultrasonic frequency signal.

In various embodiments the controller can be arranged to: receive at least one of an ultrasonic amplitude signal, an ultrasonic power signal, and an ultrasonic frequency signal; and calculate the force characteristic value for each bond based on the at least one of the ultrasonic amplitude signal, the ultrasonic power signal, and the ultrasonic frequency signal.

In an embodiment, the controller can be arranged to: receive at least one of an ultrasonic amplitude signal, an ultrasonic power signal, and an ultrasonic frequency signal; and calculate at least one of a bond period and a bond duration based on the at least one of the ultrasonic amplitude signal, the ultrasonic power signal, and the ultrasonic frequency signal.

In an embodiment, the ultrasonic amplitude signal, the ultrasonic power signal, and/or the ultrasonic frequency signal can be received from an ultrasonic controller.

In various embodiments the controller is arranged to receive a position signal from a position sensor. The position sensor can include one or more linear encoders.

In various embodiments the range of force characteristic values can be calculated as a difference between a minimum force characteristic value and a maximum force character-istic value amongst a plurality of force characteristic values. The range of force characteristic values can correlate to bond quality amongst the plurality of bonds in the work-piece. The controller can be arranged to generate an error signal based on the range of force characteristic values. In certain embodiments the controller can be arranged to generate an alarm and/or adjust one or more parameters in at least one of the first and second treatment modules to reduce the error signal.

The workpiece can include one or more continuous webs or discrete pieces of material.

According to another aspect of the disclosure, a method is provided for treating one or more workpieces during a treatment operation comprising at least two or more treat-ment modules positionable relative to each other. The method can be computer-implemented. The method com-prises: determining a force applied to at least one portion of each of the one or more workpieces during each bond in a plurality of bonds of the workpiece; analyzing the measured force to determine a force characteristic value for each bond; calculating a force adjustment value based on the force characteristic value for at least one of the plurality of bonds; and applying the force adjustment value to at least one of the treatment modules. The treatment operation can include at least one of a bonding operation, a welding operation, a soldering operation, a fusing operation, or a cutting opera-tion and applying the force adjustment value to the at least one of the treatment modules reduces bond strength vari-ability.

According to a further aspect of the disclosure, an appa-ratus is provided having a welding device for treating a workpiece. The apparatus comprises: a first treatment module; a second treatment module positionable in proximity to the first treatment module; a toggle mechanism coupled to one of the first treatment module and the second treatment module, the toggle mechanism having an input axis; a first position sensor arranged to monitor a position of the first treatment module or the second treatment module; a second position sensor arranged to monitor a position of the toggle mechanism input axis; and a controller arranged to receive a first position signal from the first position sensor and a second position signal from the second position sensor and detect an operating condition of the first treatment module or the second treatment module based on the first position signal and the second position signal. The operating condi-tion can include an alignment along the travel path of the first treatment module or the second treatment module with respect to an output axis. The toggle mechanism can be arranged to move said one of the first treatment module and the second treatment module with respect to the output axis. The treating can include a bonding operation, a welding operation, a soldering operation, a fusing operation, or a cutting operation. The toggle mechanism can be arranged to adjust a travel path of said one of the first treatment module and the second treatment module to be parallel to the output axis. The toggle mechanism can include an adjustable cam.

In various embodiments the first position sensor can include one or more linear position sensors arranged to detect a position of a welding device and output the first position signal. The apparatus can include at least one backlash compensation spring arranged to bias a backlash in a direction of a working load, in parallel with the working load along the output axis.

In various embodiments the controller can be arranged to determine the travel path of the welding device based on the second position signal. The controller can be arranged to generate an alarm when the travel path exceeds a predeter-mined threshold value past an inversion point of the toggle mechanism. The inversion point can be detected when the direction of motion of the output axis is opposite the direction of motion of the input axis as determined by monitoring the said first position sensor and said second position sensor. The predetermined threshold value can be, for example, 600 μm or greater along the input axis.

In various embodiments the apparatus can include a force sensor arranged to measure a force applied to one or more links in the toggle mechanism and output a force signal comprising a measured force value. The controller can be arranged to receive the force signal from the force sensor and calculate an external load by subtracting a force exerted by the at least one backlash compensation spring from the measured force value. The first treatment module can include an anvil and the second treatment module can include the welding device. The anvil can be a rotary anvil.

In various embodiments the welding device comprises an ultrasonic horn. The controller can be arranged to perform a Bond Balance Technology (BBT) operation in an intermit-tent bonding application or a continuous bonding applica-tion. The BBT operation can include recognizing a plurality of individual bond force peaks, recording a value for each bond force peak, and averaging two or more of the values to determine a force regulation value and/or a position regu-lation reference value.

The operating condition can include metal-to-metal con-tact and the controller can be arranged to perform metal-to-metal contact detection operation between an anvil and the welding device.

In various embodiments the apparatus can include an alarm indicator that emits a visible or audible alarm. The controller can be arranged to generate an alarm signal based on the operating condition and send the alarm signal to the alarm indicator. The controller can be further arranged to hold an actuator at a linear position that is within 100 μm, or less, of metal-to-metal contact. The alarm indicator can include a human-machine interface (HMI).

In various embodiments the controller can be arranged with Adaptive Cyclic Amplitude Regulation (ACAR) to provide ultrasonic amplitude regulation and control power delivery to the workpiece by determining a real-time ampli-tude adjustment based on historical amplitude response to reduce amplitude deviations prior to, during, and after bonding.

In various embodiments the controller can be arranged to control the welding device to create a space for a splice in the workpiece.

According to further aspect of the disclosure, an apparatus is provided for bonding a workpiece. The apparatus com-prises: a welding device arranged to apply energy to the workpiece; an anvil having an anvil pattern that includes a plurality of projections; at least one position sensor arranged to measure at least one position of the welding device and output at least one position signal; a force sensor arranged to measure a force applied to the welding device and output a force signal representative of the applied force; and a controller arranged to receive the position signal and the force signal and detect an operating condition of the welding device. A position of at least one of the welding device and the anvil can be adjusted based on the operating condition to minimize bond strength variability for intermittent projec-tions on the anvil pattern. The controller can be arranged to sample the force signal and, based on the sampled force signal, calculate a force regulation error. A position of the welding device can be adjusted when the force error exceeds a predetermined threshold. The operating condition can include at least one of a peak force, an average force, a bond period, a bond duration, and a power level. The position sensor can include one or more linear encoders.

In an embodiment the apparatus can include a toggle mechanism having a cam, wherein the controller is arranged to detect movement of the cam.

In various embodiments the controller can be arranged to perform the Bond Balance Technology (BBT) operation to track to an average of multiple bond peak forces. The controller can be arranged to control a bond force toward a selectable force. The controller can be arranged: to control an overall bond peak force or an average of peak forces of individual bonds for intermittent applications; to maintain a constant or variable force for continuous applications; to detect a treating cycle rate based on a timing analysis of the force signal, wherein the treating cycle rate comprises a rate (units/minute) at which each workpiece in a plurality of workpieces is treated, wherein the treatment comprises a bonding operation, a welding operation, a soldering opera-tion, a fusing operation, or a cutting operation; and/or with Adaptive Cyclic Amplitude Regulation (ACAR) to provide ultrasonic amplitude regulation and control power delivery by the welding device (114) to the workpiece (60).

In various embodiments ACAR can reduce amplitude deviations during bonds by matching ultrasonic regulation control response to the individual load characteristics of the distinct bonds occurring in rapid succession.

In an embodiment the apparatus can include another position sensor arranged to measure alignment of a travel path of the welding device and output another position signal. The operating condition can include the movement of the cam. The controller can be arranged to: monitor the position signal and the another position signal and determine whether the movement of the cam is due to an adjusting force applied by an operator; and/or monitor the position signal and the another position signal and determine whether the movement of the cam is due to a force other than the adjusting force applied by the operator. The operating con-dition can include metal-to-metal contact and the controller can be arranged to perform metal-to-metal contact detection operation between the anvil and the welding device.

In various embodiments the apparatus includes an alarm indicator that emits a visible or audible alarm, wherein the controller is arranged to generate an alarm signal based on the operating condition and send the alarm signal to the alarm indicator, and hold the actuator at a linear position that is within 100 μm, or less, of metal-to-metal contact. The metal-to-metal contact can be detected based on detecting an increase in standard deviation of an ultrasonic output fre-quency of an ultrasonic energy generator, such increase being at least 10%. The metal-to-metal contact can be detected based on detecting an increase in standard deviation of an ultrasonic output frequency lock quality of the ultra-sonic energy generator, such increase being at least 10%. At least one of the position sensor and the another position sensor can include a motor encoder or linear encoder. The controller can be arranged to monitor a backlash distance based on the position signal and said another position signal. The controller can be arranged to monitor a backlash dis-tance based on the position signal from a first position sensor and said another position signal from a second position sensor, wherein the backlash distance is monitored during the application of intermittent force.

According to another aspect of the disclosure, an appa-ratus is provided having a first treatment module and a second treatment module positionable in proximity to the first treatment module, wherein at least one of the first treatment module and the second treatment module includes a welding device for treating one or more workpieces, the apparatus comprising a controller arranged to: measure an edge force at each of a plurality of first edges of a workpiece and an edge force at each of a plurality of second edges of an adjoining workpiece; analyze the first plurality of edge forces and the second plurality of edge forces to determine a peak trailing edge force and a peak leading edge force; determine a force adjustment value based on the peak trailing edge force and the peak leading edge force; and apply the adjustment value to at least one of the first treatment module and the second treatment module. At least one of the plurality of first edges or at least one of the plurality of second edges can include a trailing edge or a leading edge, wherein the treating can comprise a bonding operation, a welding operation, a soldering operation, a fusing operation, or a cutting operation. The force adjust-ment value can be determined based on an average or a mean value of the peak trailing edge force and the peak leading edge force.

According to yet another aspect of the disclosure an apparatus is provided having a first treatment module and a second treatment module positionable in proximity to the first treatment module, wherein at least one of the first treatment module and the second treatment module includes a welding device for treating one or more workpieces, the apparatus comprising a controller arranged to: receive one or more signals, including at least one of a force signal, an ultrasonic amplitude signal, an ultrasonic power signal, an ultrasonic frequency signal, and a position signal; calculate a plurality of bond force peak values based on the received one or more signals; and calculate a bond force span value based on the plurality of bond force peak values. The bond force span value is calculated as a difference between a minimum bond force peak value and a maximum bond force peak value during a treatment operation. The bond force value is monitored during the treatment operation as a bond balance error signal for process consistency. The bond force span value can include a range of force values during a treatment operation.

According to yet another aspect of the disclosure an apparatus is provided having a first treatment module and a second treatment module positionable in proximity to the first treatment module, wherein at least one of the first treatment module and the second treatment module includes a welding device for treating one or more workpieces, the apparatus comprising a controller arranged to: receive a real-time amplitude signal of ultrasonic vibration of at least one of the first treatment module and the second treatment module during a treatment cycle; segment the amplitude signal into a plurality of amplitude segments for the treatment cycle; monitor an amplitude value of each of the plurality of amplitude segments during the treatment cycle; operate a plurality of closed-loop control algorithms to determine a plurality of amplitude adjustment values, each of the plurality of amplitude adjustment values corresponding to a respective one of the plurality of amplitude segments; and apply each amplitude adjustment value to the corresponding respective one of the plurality of amplitude segments during the subsequent treatment cycle in real-time. The treatment cycle can include treating a single workpiece in a plurality of workpieces. The treating can comprise a bonding operation, a welding operation, a soldering operation, a fusing operation, or a cutting operation. The controller can be arranged to: generate a proportional-integral-derivative (PID) setting for each of the plurality of amplitude segments; and apply each PID setting to the respective one of the plurality of amplitude segments.

The apparatus can further comprise: a force sensor arranged to measure a force applied to at least one of the first treatment module and the second treatment module and output a force signal representative of the applied force; an amplitude sensor arranged to detect and measure ultrasonic vibration in real-time and output the ultrasonic amplitude signal; a power sensor arranged to detect and measure real-time power supplied to, or applied by, at least one of the first treatment module and the second treatment module; and at least one position sensor arranged to detect and measure a real-time position of at least one of the first treatment module and the second treatment module, including a real-time position of the welding device. The controller can be arranged: to detect a treating cycle rate based on a timing analysis of at least one of the force signal, the ultrasonic amplitude signal, the ultrasonic power signal, and the at least one position signal, wherein the treating cycle rate comprises a rate (units/minute) at which each workpiece in a plurality of workpieces is treated; and/or with Adaptive Cyclic Amplitude Regulation (ACAR) to provide ultrasonic amplitude regulation and control power delivery to the workpiece by determining a real-time amplitude adjustment based on historical amplitude response to reduce amplitude deviations prior to or during bonding. Each of the plurality of closed-loop control algorithms can include a separate Proportional-Integral-Derivative (PID) tuning loop corresponding to a respective one of the plurality of amplitude segments.

In various embodiments the controller can be arranged to: receive one or more signals, including at least one of the force signal, the ultrasonic amplitude signal, the ultrasonic power signal, and the at least one position signal; calculate a plurality of bond force peak values based on the received one or more signals; and calculate a bond force span value based on the plurality of bond force peak values. The bond force span value can be calculated as a difference between a minimum bond force peak value and a maximum bond force peak value during a treatment operation. The bond force value can be monitored during the treatment operation as a bond balance error signal for process consistency.

According to a still further aspect of the disclosure an apparatus is provided having at least a first treatment module and a second treatment module positionable in proximity to the first treatment module, wherein at least one of the first treatment module and the second treatment module includes a welding device for treating one or more workpieces. The apparatus comprises: a force sensor arranged to measure a force applied to at least one of the first treatment module and the second treatment module and output a force signal representative of the applied force; an amplitude sensor arranged to detect and measure the real-time ultrasonic vibration and output the ultrasonic amplitude signal representative of the real-time ultrasonic vibration; a power sensor arranged to detect and measure real-time power supplied to, or applied by, at least one of the first treatment module and the second treatment module and output the ultrasonic power signal representative of the real-time power; and at least one position sensor arranged to detect and measure a real-time position of at least one of the first treatment module and the second treatment module, including a real-time position of the welding device and output at least one position signal. A treating cycle rate can be detected based on a timing analysis of at least one of the force signal, the amplitude signal, the power signal, and the at least one position signal. The treating cycle rate can include a rate (units/minute) at which each workpiece in a plurality of workpieces is treated. The apparatus can comprise a controller. The controller can be arranged to: receive one or more signals, including at least one of the force signal, the ultrasonic amplitude signal, the ultrasonic power signal, and the at least one position signal; calculate a plurality of bond force peak values based on the received one or more signals; and calculate a bond force span value based on the plurality of bond force peak values. The bond force span value can be calculated as a difference between a minimum bond force peak value and a maximum bond force peak value amongst a plurality of bond force peak values during a treatment operation. The bond force value can be monitored during the treatment operation as a bond balance error signal for process consistency.

Additional features, advantages, and embodiments of the disclosure may be set forth or apparent from consideration of the detailed description and drawings. Moreover, it is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention.

Figure 1A:
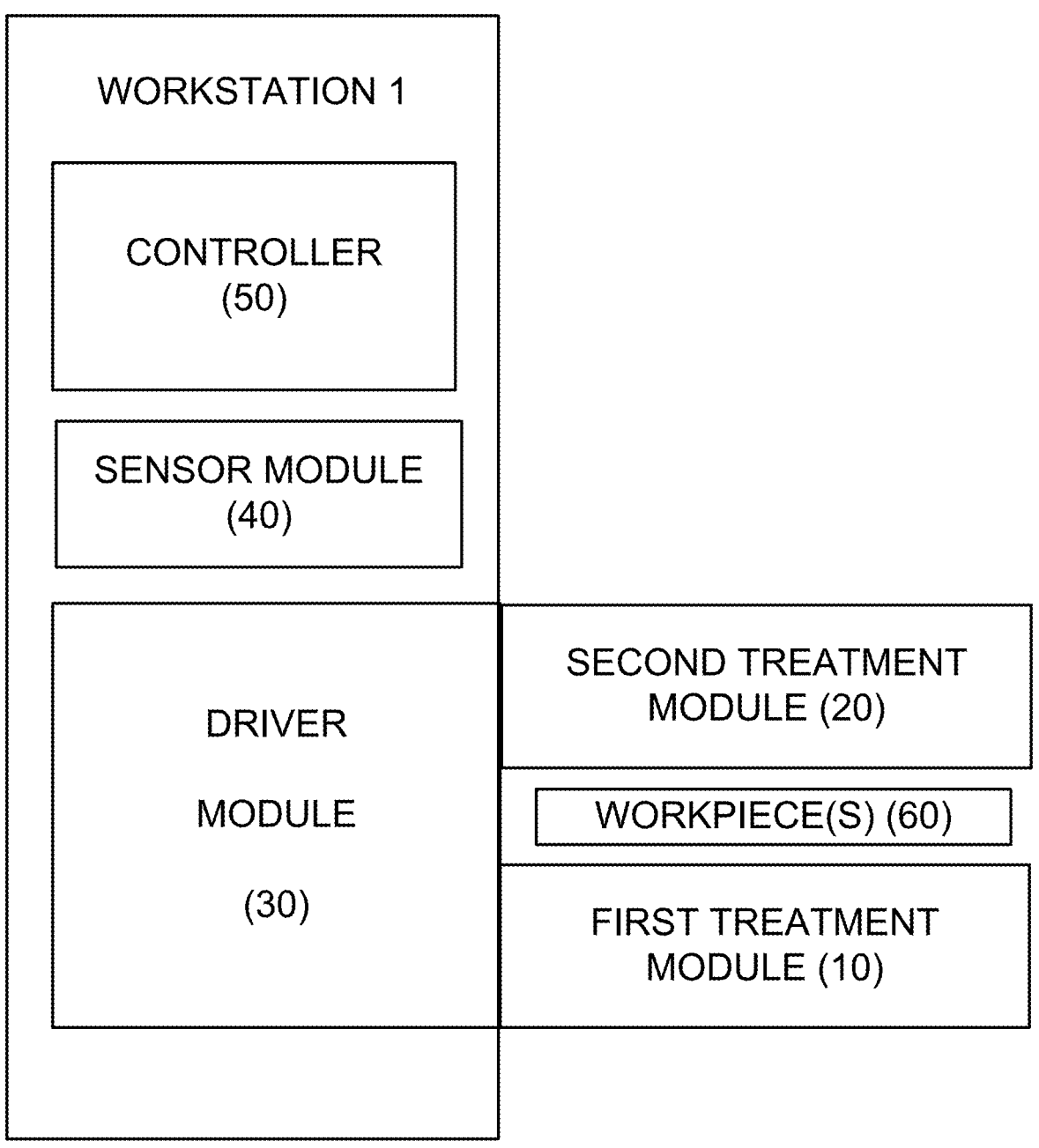
FIG. 1A shows a block diagram of an embodiment of a workstation constructed according to the principles of the disclosure.

The present disclosure is further described in the detailed description that follows.

DETAILED DESCRIPTION OF THE INVENTION

The invention and its various features and advantageous details are explained more fully with reference to the non-limiting embodiments and examples that are described or illustrated in the accompanying drawings and detailed in the following description. It is noted that features illustrated in the drawings are not necessarily drawn to scale, and features of one embodiment can be employed with other embodiments, as those skilled in the art will recognize, even if not explicitly stated. Descriptions of well-known components and processing techniques may have been omitted so as to not unnecessarily obscure the embodiments of the invention. The examples are intended merely to facilitate an understanding of ways in which the invention can be practiced, and to further enable those skilled in the art to practice the embodiments of the invention. Accordingly, the examples and embodiments should not be construed as limiting the scope of the invention. Moreover, it is noted that like reference numerals represent similar parts throughout the several views of the drawings.

Figure 1B:
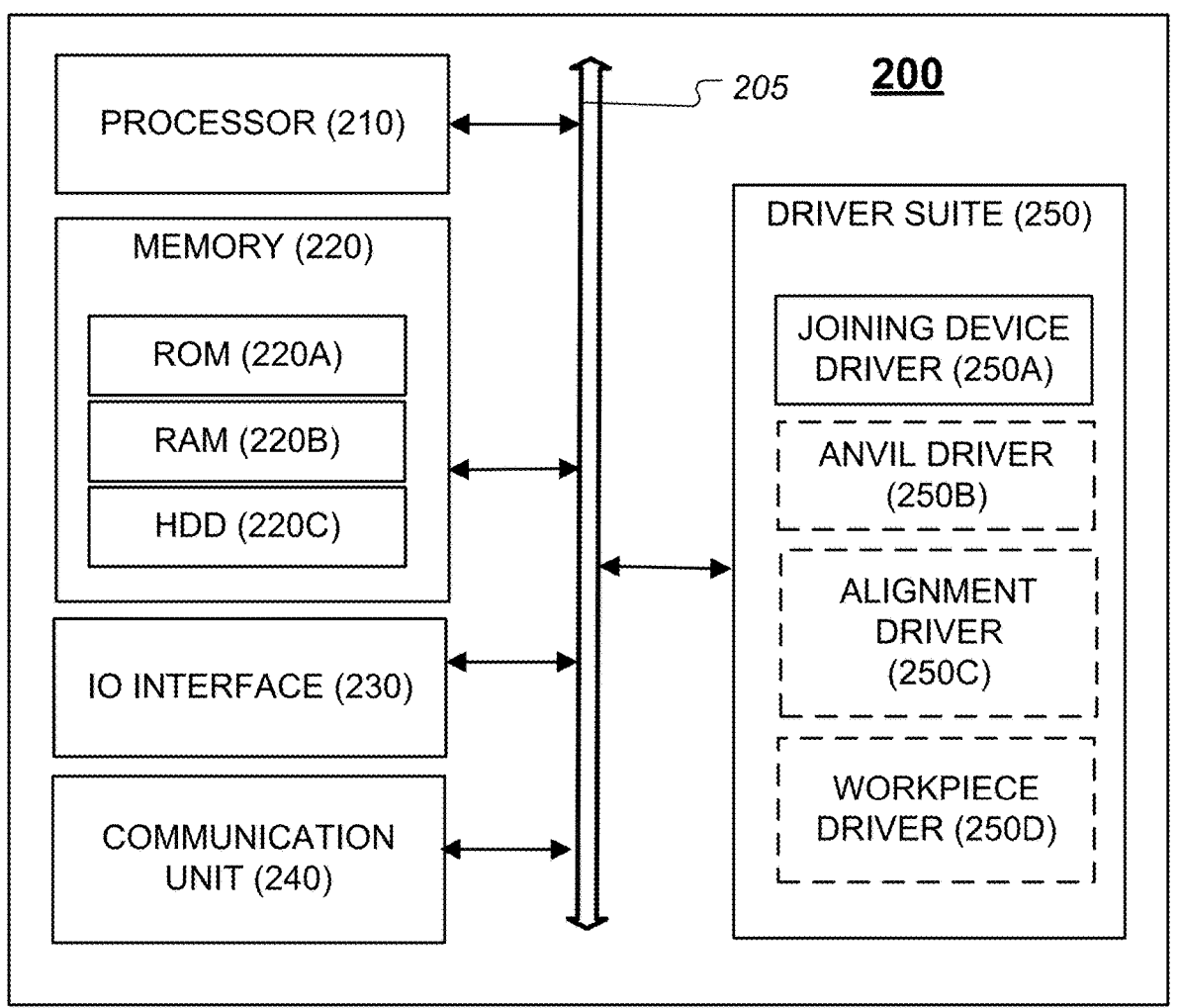
FIG. 1B shows an embodiment of a controller constructed according to the principles of the disclosure, which can be included in the workstation in FIG. 1A.

FIG. 1A shows an embodiment of a workstation 1 constructed according to the principles of the disclosure. In various embodiments, the workstation 1 can be configured as a single machine or device, or a plurality of machines or devices, comprising components or modules configured to interact and operate as described below. The workstation 1 includes at least one of a first treatment module 10 and a second treatment module 20, a driver module 30, a sensor module 40 and a controller 50. In various embodiments the controller 50 can be configured as seen in FIG. 1B. In certain embodiments the driver module 30 can be incorporated in the controller 50, for example, as the driver suite 250 (shown in FIG. 1B).

In certain embodiments the controller 50 can communicate with one or more controllers (not shown), which can be provided external to the workstation 1, or provided in at least one of the first and second treatment modules 10, 20, and configured to receive at least one of a force signal, an ultrasonic amplitude signal, an ultrasonic power signal, and an ultrasonic frequency signal from the one or more controllers (not shown). The workstation 1 can be configured to receive one or more workpieces 60 for treatment, such as, for example, bonding, welding, soldering, fusing, or cutting. For instance, two or more workpieces 60 can be bonded, welded, soldered, or fused together by the first treatment module 10 and/or the second treatment module 20.

In various applications, the workpiece(s) 60 can include, for example, one or more continuous webs or discrete pieces of material. The workpiece(s) 60 can include, for example, two or more layers of nonwoven material by treatment. The treatment can include, for example, bonding, welding, or fusing the two or more layers of nonwoven material together. The treatment can further include cutting the bonded, welded, or fused layers into one or more products having a predetermined shape and dimensions (for example, width, length, thickness).

In other applications, the workpiece(s) 60 can include one or more materials or products to be treated. The treatment can include, for example, bonding, welding, or fusing the workpiece 60 to a material, an object, or another workpiece 60. The treatment can include cutting the workpiece(s) 60 to a predetermined shape or dimensions, including, for example, width, height, length.

In various embodiments, either or both the first treatment module 10 and the second treatment module 20 each can include one or more joining devices such as, for example, a sonotrode (or horn), a cylindrical sonotrode (or horn), a blade sonotrode (or horn), a block sonotrode (or horn), a rotary sonotrode (or horn), a laser welder, an arc welder, a resistance metal inert gas (MIG) welder, a plasma arc welding (PAW) welder, a tungsten inert gas (TIG) welder, an anvil, a rotary anvil, a fixed shaped nest, or other device capable of treating one or more workpieces 60, and/or holding the one or more workpieces 60 during treatment. The joining device(s) can have a shape and dimensions (including, for example, width, length height) contoured to the workpiece(s) 60 to be treated.

Figures 13A, 13B:
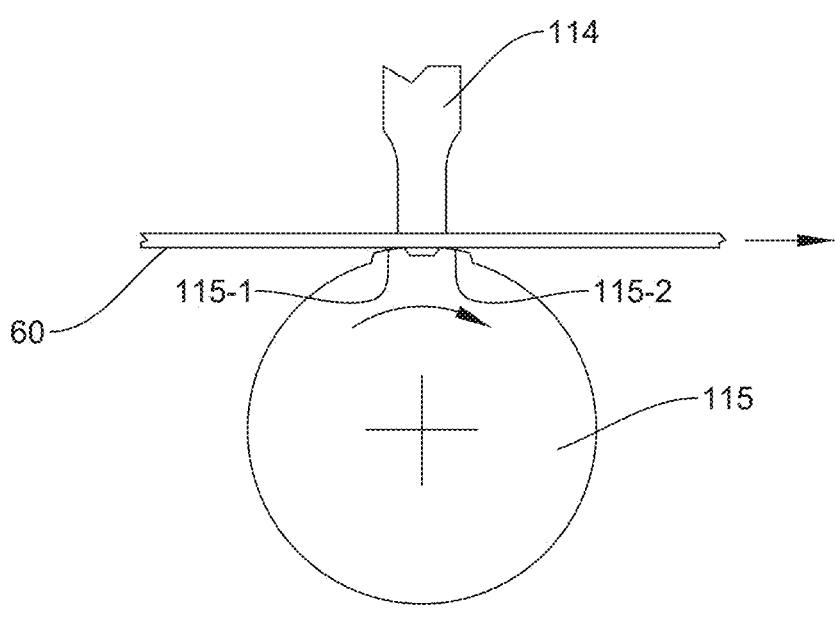
FIGS. 13A and 13B show two nonlimiting embodiments of a joining device and an anvil positioned for treating a workpiece moving in a direction depicted by an arrow.

One of the first treatment module 10 and the second treatment module 20 can include a joining device (for example, a sonotrode) or a cutting device capable of transferring energy (for example, ultrasonic energy) to the workpiece 60 being treated, including welding, soldering, fusing, or cutting; and the other of the first treatment module 10 and the second treatment module 20 can include an anvil, such as, for example, an anvil 115 (shown in FIG. 13A or 13B). The first module 10 and the second module 20 can be provided opposite each other and aligned with the workpiece 60 to be treated.

At least one of the first treatment module 10 and the second treatment module 20 can include one or more sensors (for example, position sensor, voltage sensor, current sensor, frequency sensor, temperature sensor, pressure sensor, humidity sensor, or the like), which can be incorporated into as a sensor module (not shown).

At least one of the first treatment module 10 and the second treatment module 20 can include one or more drivers (for example, a DC motor driver, an AC motor driver, a variable-frequency driver, a servo-motor driver, a stepper motor driver, a pneumatic driver, or the like) configured to drive one or more components in the module(s) 10, 20. The components can include, for example, a DC motor, an AC motor, a variable-frequency motor, a servomotor, a stepper motor, a pneumatic actuator, or the like.

In various embodiments, the first treatment module 10 and/or the second treatment module 20 can include a rotary joining device (not shown) configured to rotate about an axis or a fixed joining device (not shown) configured to move in a single plane along a linear axis. The first treatment module 10 and/or the second treatment module 20 can include a combination of one or more rotary joining devices and/or fixed joining devices. The joining device can include one or more ultrasonic horns and/or one or more anvils (for example, anvil 115 shown in FIG. 13A or 13B). The one or more ultrasonic horns can be configured to perform a treatment operation such as, for example, joining, welding, or cutting one or more materials.

In various embodiments, the first treatment module 10 includes one or more anvils (for example, 115 shown in FIG. 13A or 13B) and the second treatment module 20 includes one or more joining devices. The joining device(s) can include, for example, an ultrasonic horn. The joining device(s) can be configured for joining, welding, adhering, or cutting material.

The driver module 30 can include an energy source configured to supply energy and/or material to the first treatment module 10 and/or the second treatment module 20 to power, operate, or control the joining device(s), including, for example, any combination of electricity, gas, fluid, or material.

In various embodiments, the driver module 30 can include any one or more of, for example, a motor, a linear servo actuator, a servomotor, a rotary servo motor, a stepper motor coupled to a rotary-to-linear converter, a servomechanism, a linear motor, a stepper motor, a minor loop feedback motor, a pneumatic actuator, a hydraulic actuator, or other drive mechanism configured to transform energy to a linear, rotary, or oscillatory motion, including one or more mechanisms that can be operated or controlled by means of an electric current or voltage, a pressurized fluid (for example, a gas or a liquid).

In certain embodiments, the driver module 30 includes a pair of driver modules, one of which is configured to drive the first treatment module 10 and the other of which is configured to drive the second treatment module 20. In an embodiment one of the pair of driver modules can be configured to rotate the joining device in the first treatment module 10. The other of the pair of driver modules can be configured to rotate the joining device in the second treatment module 20.

Figure 2:
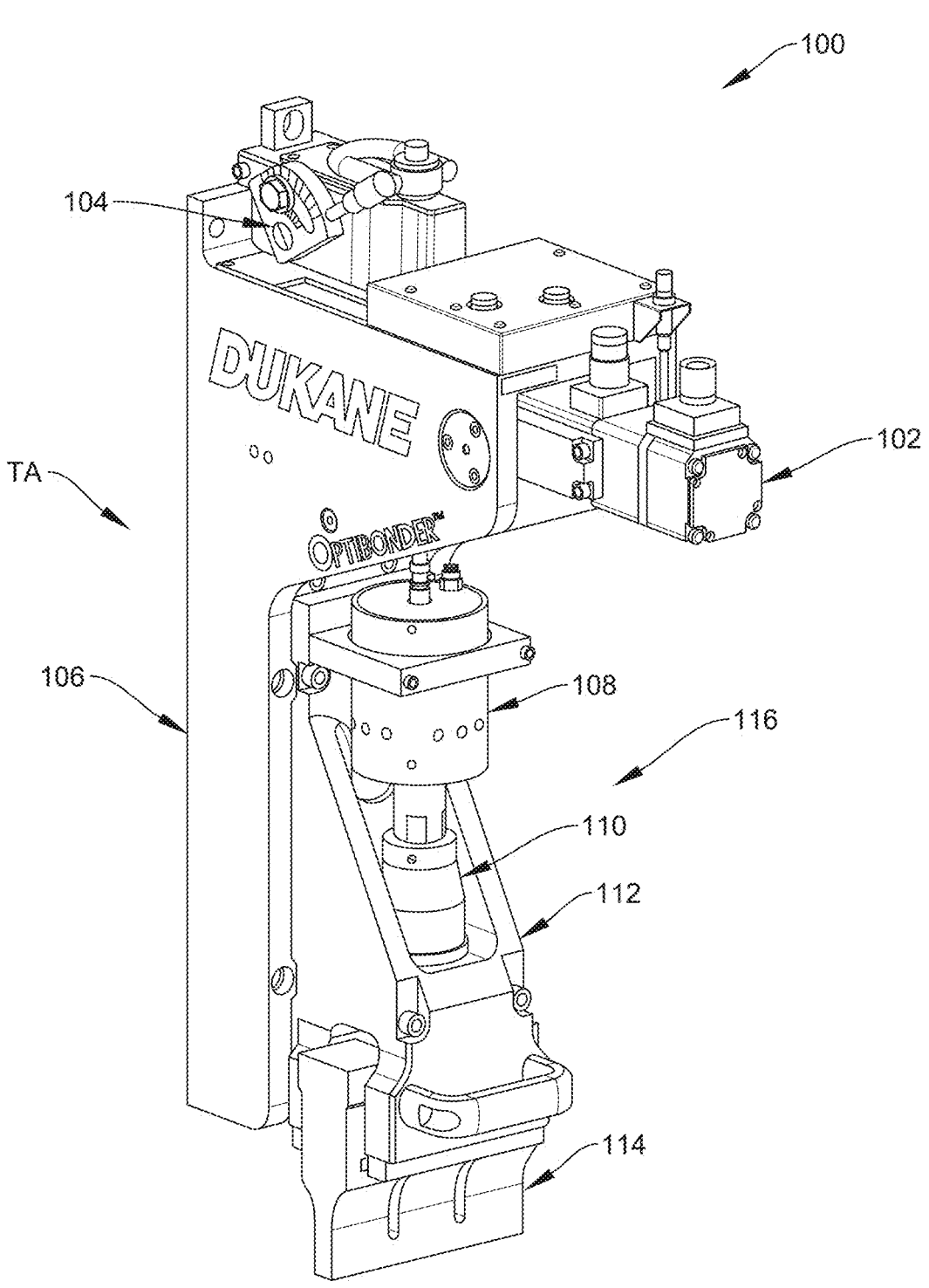
FIG. 2 shows an embodiment of the welding system constructed according to the principles of the disclosure, which can include the workstation in FIG. 1.

In an embodiment, the driver module 30 includes an actuator 102 and/or a ram module 116 (shown in FIG. 2).

The sensor module 40 can include one or more sensors configured to detect, measure, or monitor components or properties in various parts of the workstation 1. The sensor module 40 can include one or more position sensors configured to detect, measure, and monitor a position of the first treatment module 10, the second treatment module 20, or one or more workpieces 60.

Figure 3:
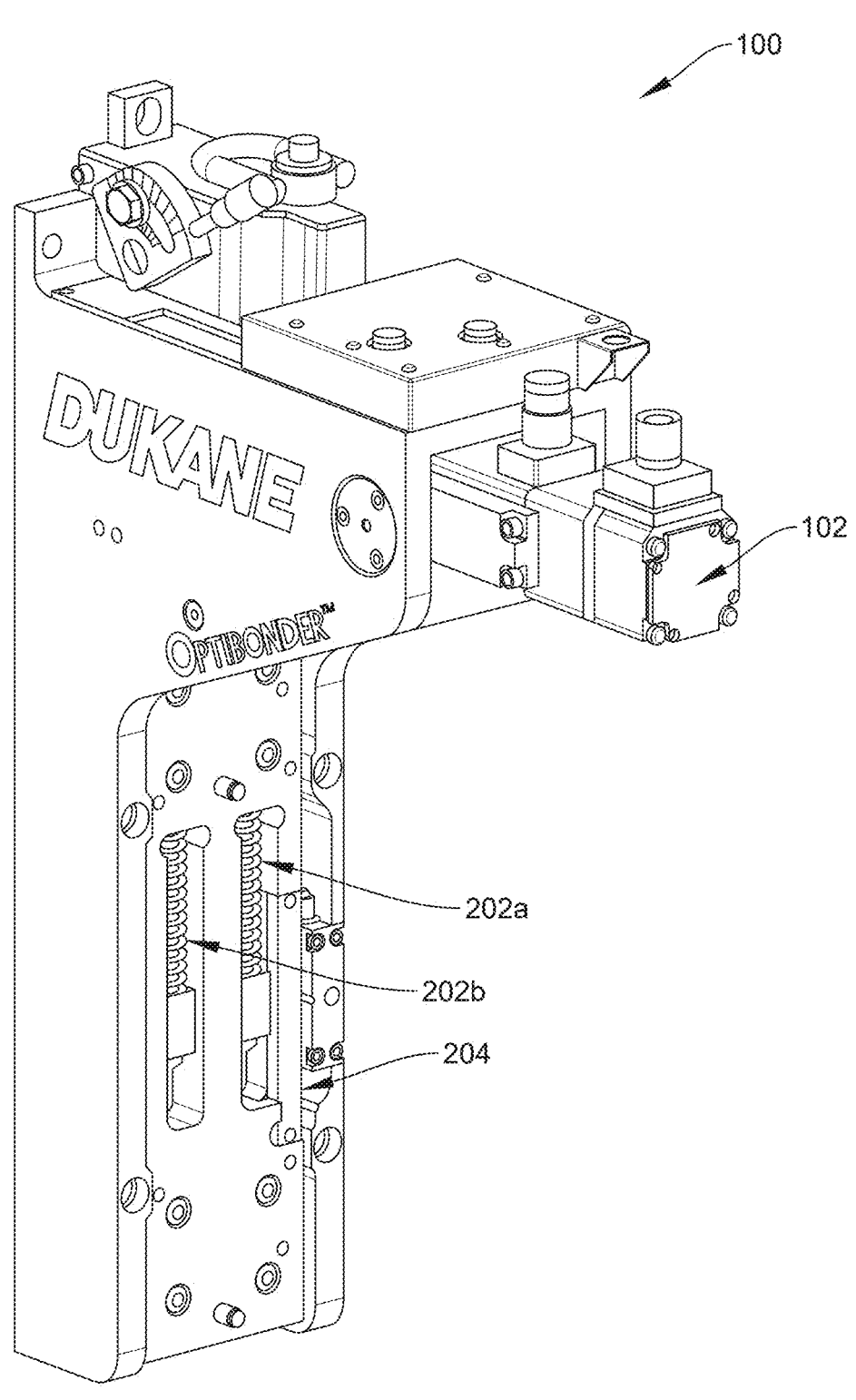
FIG. 3 shows a portion of the welding system in FIG. 2 with certain components removed to show certain covered features in the welding system.
Figure 4:
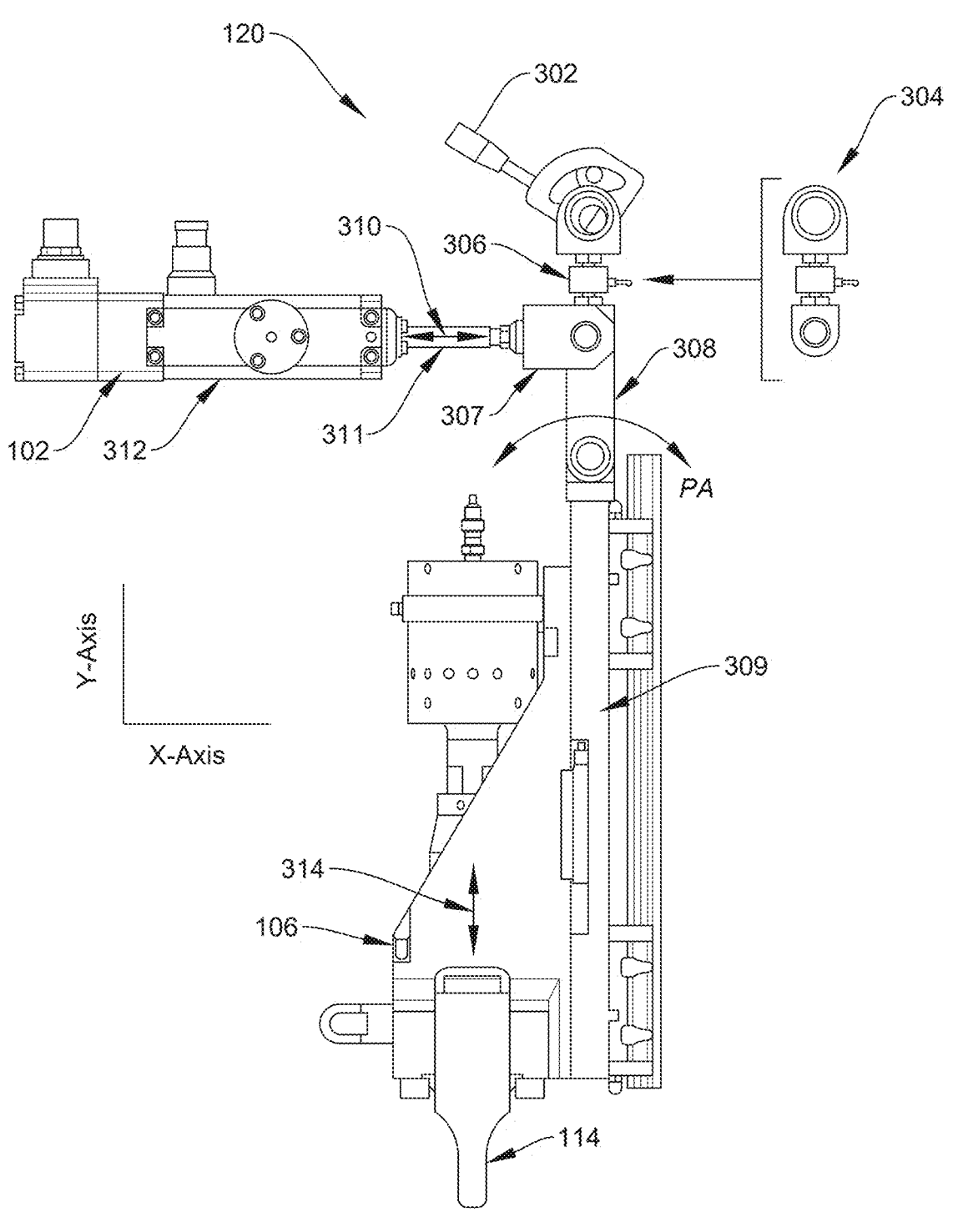
FIG. 4 shows the welding system in FIG. 2 with the frame removed.

In an embodiment, the sensor module 40 includes a linear position sensor 204 (shown in FIG. 3), an actuator position sensor 312 (shown in FIG. 4), and a force sensor 306 (shown in FIG. 4).

The controller 50 can include one or more processors configured for operation and control of the workstation 1, including one or more of the first treatment module 10, the second treatment module 20, the driver module 30, the sensor module 40, and the workpiece(s) 60. In various embodiments, the controller 50 can include a Programmable Logic Controller (PLC) (not shown). The PLC (not shown) can include a power supply, an input module, a processor, a programming device, and an output module. The one or more processors are configured to control the interactions of the various components, including the interaction between the first treatment module 10, the second treatment module 20, the driver module 30, and the workpiece(s) 60, such that the one or more workpieces 60 are supplied to and positioned in a predetermined location, and held in alignment according to a predetermined configuration, proximate to the first treatment module 10 and/or the second treatment module 20; then the first treatment module 10 and/or the second treatment module 20 are operated and controlled to treat the workpiece(s) 60 according to a predetermined treatment, such as, for example, bonding, welding, soldering, fusing, or cutting.

The Controller

FIG. 1B illustrates a block diagram of an embodiment of a controller 200 constructed according to the principles of the disclosure. In various embodiments the controller 50 (shown in FIG. 1A) can be configured as the controller 200. In certain embodiments the controller 200 can be included in at least one of the first treatment module 10 and the second treatment module 20, or provided external to the workstation 1 (shown in FIG. 1A) and connected through one or more wired or wireless connections. The controller 200 includes a bus 205, a processor 210, a memory 220, an input-output (IO) interface 230, a communication unit 240, and a driver suite 250. Any of the components 210 to 250 can be interconnected using various buses, including the bus 205, and can be mounted on a common motherboard or in another manner, as appropriate.

The processor 210 can be arranged to process instructions for execution within the controller 200, including instructions stored in the memory 220. The processor 210 can include any of various commercially available processors. Dual microprocessors and other multi-processor architectures can be employed as the processor 210. The processor 210 can include a central processing unit (CPU), an application-specific integrated circuit (ASIC), or a graphic processing unit (GPU). The processor 210 is arranged to interact with all of the components in the controller 200 to carry out or facilitate the processes described herein.

The bus 205 can include any of several types of bus structures that can further interconnect to a memory bus (with or without a memory controller), a peripheral bus, and a local bus using any of a variety of commercially available bus architectures.

The memory 220 includes a read-only memory (ROM) 220A and a random-access memory (RAM) 220B. In certain embodiments, the memory 220 can include a hard disk drive (HDD) 220C. The memory 220 can provide nonvolatile storage of data, data structures, and computer-executable instructions, and can accommodate the storage of any data in a suitable digital format. The memory 220 can include a computer-readable medium that can hold executable or interpretable computer code (or instructions) that, when executed by the processor 210, cause the steps, processes and methods in this disclosure to be carried out.

The computer-readable medium can be contained in the memory 220, and can include sections of computer code that, when executed by the processor 210, cause the controller 200 to perform the processes and operations provided in this disclosure.

In an embodiment, a basic input-output system (BIOS) can be stored in the ROM 220A, which can include a non-volatile memory, an erasable programmable read-only memory (EPROM), or an electrically erasable programmable read-only memory (EEPROM). The BIOS can contain the basic routines that help to transfer instructions and data between any one or more of the components in the controller 200, such as during start-up.

The RAM 220B can include dynamic random-access memory (DRAM), a synchronous dynamic random-access memory (SDRAM), a static random-access memory (SRAM), a nonvolatile random-access memory (NVRAM), or another high-speed RAM for caching data.

In certain embodiments the HDD 220C can include, for example, an enhanced integrated drive electronics (EIDE) drive, a serial advanced technology attachments (SATA) drive, or any suitable hard disk drive. The HDD 220C can be configured for external use in a suitable chassis (not shown).

A computer program product can be tangibly embodied in a non-transitory computer-readable medium, which can be contained in the memory 220. The computer program product can contain instructions that, when executed by the processor 210, cause the processor 210 to perform one or more methods, instructions, or operations, such as those included in this disclosure.

The input-output (IO) interface 230 can receive commands or data from an operator via a user interface (not shown), such as, for example, a keyboard (not shown), a touch-display (not shown), a mouse (not shown), a pointer (not shown), a stylus (not shown), an interactive voice response (IVR) system (not shown), a microphone (not shown), a speaker (not shown), or a display device (not shown). The received commands and data can be forwarded from the IO interface 230 as instruction signals and/or data signals, via the bus 205, to any of the components in the controller 200.

The communication unit 240 can be configured to connect to and/or exchange communication signals with external communication devices (not shown), such as, for example, display devices, speaker devices, alarm devices, computers, mobile computers, computer tablets, laptops, smartphones, force sensors, position sensors, temperature sensors, voltage sensors, current sensors, power sensors, frequency sensors, pressure sensors, or other electronic sensor devices. The communication unit 240 can include a modem, a transmitter, a receiver or a transceiver. The communication unit 240 can include a wired or a wireless communication network interface. The communication unit 240 can generate an alarm signal and output the signal to a display device or an alarm device that produces a visible and/or audible alarm.

The driver suite 250 includes one or more joining device drivers 250A, each of which is configured to generate and send a drive signal to a corresponding joining device (for example, an ultrasonic horn) to operate the joining device(s), for example, according to the various embodiments described in this disclosure. The driver suite 250 can optionally include an anvil driver 250B, an alignment driver 250C, and/or a workpiece driver 250D.

The joining device driver 250A can be configured to interact with the processor 210 and generate one or more joining device drive signals to control operation of one or more joining devices in the treatment modules 10 and/or 20 (shown in FIG. 1A), or the joining device 114 (shown in FIGS. 2-6). Referring to the embodiments depicted in FIGS. 2-6, the joining device drive signal(s) can be supplied to a ram 112 to power and control operation of the joining device 114 (for example, an ultrasonic horn), as well as the components that cause the device 114 to move along an output axis 314 (shown in FIG. 4), such as, for example, a motor (not shown). Based on the joining device drive signal(s), the processor 210 can control operation of the device 114, including an operating frequency of the device 114, an operating power level of the device 114, a duration (or time) of operation of the device 114, the travel distance of the device 114 along the output axis 314 (shown in FIG. 4), and a force applied by the device 114 to the workpiece 60 (shown in FIG. 1), including the duration of the applied force.

The optional anvil driver 250B can be included in the embodiments of the workstation 1 comprising at least one adjustable anvil (not shown). The anvil driver 250B can be configured to interact with the processor 210 and generate one or more anvil drive signals to control operation of a corresponding one of the one or more anvils (for example, anvil 115 shown in FIG. 13A or 13B), such as, for example, positioning and alignment of the anvil.

The optional alignment driver 250C can be included in embodiments of a welding device 100 equipped with an automated adjustable cam 104 (shown in FIG. 4). The alignment driver 250B can be configured to interact with the processor 210 and generate a cam drive signal to control operation of an adjustable cam 104 to move a toggle mechanism 120 (shown in FIG. 4) into alignment with the output axis 314 (shown in FIG. 4).

The optional workpiece driver 250D can be included in the embodiments of the welding system 100 comprising an automated placement mechanism (not shown), such as, for example, feeding and/or aligning and positioning the workpiece 60 (shown in FIG. 1) for treatment by the device 114.

Referring to FIG. 1A, the first treatment module 10 and/or the second treatment module 20 can include any of the welding devices and/or anvils described in commonly assigned U.S. Pat. Nos. 10,259,165 B2, 10,746,703 B1, 10,807,314 B1, 11,407,182 B1, and 11,254,066 B2, all of which are incorporated herein in their entireties.

Welding System

FIGS. 2-6 show various views of an embodiment of a welding system 100 constructed according to the principles of the disclosure. In various embodiments, the welding system 100 can include the workstation 1 (shown in FIG. 1) in which: the first treatment module 10 includes a joining device (not shown) such as an anvil or a rotary anvil (for example, anvil 115 shown in FIG. 13A or 13B); the second treatment module 20 includes a joining device 114 such as an ultrasonic horn; and the sensor module 40 includes the linear position sensor 204 (shown in FIG. 3), the actuator position sensor 312 (shown in FIG. 4), and the force sensor 306 (shown in FIG. 4).

Figure 9:
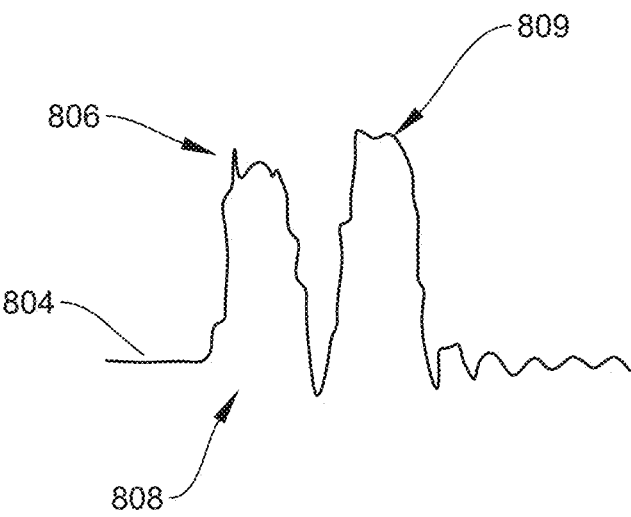
FIG. 9 shows a typical force signal of a dual bond intermittent welding application.

In various embodiments the welding system 100 can include a controller 50/200 configured to reduce bond variability for intermittent projections on a treatment module 10 having anvil pattern rolls. The controller 50/200 can be configured to receive force signals or force signal samples from the force sensor 306, apply a force sampling algorithm, and track to an average of multiple bond force peaks in a Bond Balance Technology (BBT), as discussed in detail below. The controller 50/200 can include, for example, a sample-and-hold circuit (not shown) that samples the force signals from the force sensor 306. The controller 50/200 can be configured to reduce amplitude spikes, both positive and negative, during bonds (for example, as seen in FIG. 9).

In various embodiments, the controller 50/200 can be configured to monitor and detect unwanted cam movement. In certain embodiments, the controller 50/200 can monitor position signals from both position sensors 204 (shown in FIG. 3) and 312 (shown in FIG. 4) and detect if the cam moved from unwanted instantaneous high force or operator adjustment. If unwanted movement is detected, the controller 50/200 can generate a fault signal and stop machine operation.

In certain embodiments in which the treatment module 10 includes an ultrasonic horn and the treatment module 20 includes an anvil, the controller 50/200 can be configured to monitor and detect when the horn and anvil surfaces are not parallel. In this regard, the controller 50/200 can be configured to monitor position signals from both position sensors 204 and 312 to detect if the two surfaces are no longer parallel from unwanted instantaneous high forces. If the controller 50/200 determines the surfaces are not parallel based on the position signals, the controller 50/200 can generate a fault signal and stop machine operation. Another algorithm for detecting non-parallel condition between a horn and an anvil could utilize ultrasonic Power monitoring. When horn and anvil are parallel to each other the contact area is the greatest, and, at a given force, will result in the highest ultrasonic Power draw. Should these two surfaces become nonparallel at the same force, the ultrasonic Power value would decrease. Either rolling average or Standard Deviation of the Power could be used to determine the change is parallelism.

In various embodiments, the controller 50/200 can be configured for closed loop operation for bonding continuous webs with improved bond quality variability, with minimized maintenance intervals and automatic maintenance monitoring.

In the embodiment depicted in FIGS. 2-6, the welding system 100 includes a thruster assembly TA, which includes an actuator 102, a frame 106, the ram module 116, the toggle mechanism 120 (shown in FIG. 4), and the linear position sensor 204 (shown in FIG. 3). The welding system 100 can include a cam 104. The actuator 102 can include, for example, a motor, a linear servo actuator, a servomotor, a rotary servo motor, a stepper motor coupled to a rotary-to-linear converter, a servomechanism, a linear motor, a stepper motor, a minor loop feedback motor, a pneumatic actuator, a hydraulic actuator, or other drive mechanism configured to transform energy to a linear, rotary, or oscillatory motion, including one or more mechanisms that can be operated or controlled by means of an electric current or voltage, a pressurized fluid (for example, a gas or a liquid).

In various embodiments, the actuator 102 can be configured to receive power from a power supply (such as, for example, an electric power supply). The actuator 102 can be configured to receive a control signal to control operation of the actuator, including, for example, to drive or move an actuator drive shaft 311 along an input axis 310 (shown in FIG. 4). The actuator 102 can include an actuator position sensor 312 (shown in FIG. 4), such as, for example, a rotary encoder, that can detect, measure and monitor the position of the actuator drive shaft 311 and/or the actuator 102 in real-time, as well as the overall welding system 100.

The cam 104 can be configured to be adjustable. The cam 104 can be configured to adjust a base line or a starting point or an end point of an energy stack in the ram module 116. In various embodiments, the cam 104 is configured to be automatically adjustable such as by an actuator (for example, in the driver module 30, shown in FIG. 1) or manually adjustable, such as, for example, via a cam handle 302, as seen in FIG. 4.

In certain embodiments comprising the cam actuator (in the driver module 30, shown in FIG. 1), the cam actuator can include, for example, a motor, a linear servo actuator, a servomotor, a rotary servo motor, a stepper motor coupled to a rotary-to-linear converter, a servomechanism, a linear motor, a stepper motor, a minor loop feedback motor, a pneumatic actuator, a hydraulic actuator, or other drive mechanism configured to transform energy to a linear, rotary, or oscillatory motion, including one or more mechanisms that can be operated or controlled by means of an electric current or voltage, a pressurized fluid (for example, a gas or a liquid). The cam actuator can include a position sensor (not shown) configured to detect and measure the real-time position of the cam 104 and generate a cam position signal and send the cam position signal to the controller 50/200 (shown in FIGS. 1A, 1B).

The frame 106 can be configured to support the actuator 102, ram module 116, and the toggle mechanism 120 during each operating cycle, including maintaining positioning and operation of each component according to predetermined specification requirements. The frame 106 is configured to support and hold the actuator 102 as it interacts with or moves (directly or through an intervening device such as the actuator drive shaft 311) a portion of the toggle mechanism 120. The frame 106 is also configured to support and hold the ram module 116 as the energy stack in the ram module 116 operates.

The ram module 116 includes a ram 112 and the energy stack. The energy stack includes a transducer 108, an optional booster 110, and the device 114. The ram module 116 can be configured to move the device 114 linearly and press it against the workpiece(s) 60 (shown in FIG. 1) to be treated. As noted above, the workpiece(s) 60 can include one or more materials and/or products to be bonded, welded, soldered, fused, or cut.

FIG. 3 shows a view of the welding system 100 with the ram module 116 removed to show one or more backlash compensation springs 202 (for example, a pair of springs 202a and 202b) and a position sensor 204 that can be included, for example, in the thruster assembly TA. In various embodiments, the backlash compensation spring 202 can include any suitable energy transfer mechanism that converts positional displacement to potential energy. The backlash compensation spring 202 (202a, 202b) can be configured to bias any backlash force in a direction of the working load, in parallel with the working load along an output axis 314 (shown in FIG. 4). In some applications, the output axis 314 can be parallel with gravity—specifically, the gravity vector defined by the direction of gravity. The position sensor 204 can be configured to detect, measure, and monitor the position of the ram module 116 in real-time and send a real-time stack position signal to, for example, the controller 50/200 (shown in FIGS. 1A, 1B). The position sensor 204 can include a linear position sensor that detects, measures, and monitors the real-time position of the ultrasonic stack, including the transducer 108, optional booster 110, and device 114.

Linear Encoder

FIG. 4 shows a view of the welding system 100 with the frame 106 removed to facilitate a better understanding of the toggle mechanism 120, according to the principles of the disclosure. The toggle mechanism 120, which comprises (or is linked to) the cam 104 (shown in FIG. 2), includes one or more links that facilitate multi-axial movement of the toggle mechanism 120, such as, for example, in an x-y plane formed by an x-axis and a y-axis. In at least one embodiment, the x-axis includes the input axis 310 and the y-axis includes the output axis 314. The one or more links can include a cam link (or first link) 304, an actuator link (or second link) 307, and a ram link (or third link) 308. The toggle mechanism 120 can be connected to, or incorporate, the force sensor 306, which is configured to detect, measure, and monitor a force applied to any one or more of the links in the toggle mechanism 120, including, for example, the cam link 304, the actuator link 307, and/or the ram link 308, and generate a toggle force signal indicative of the force applied to the particular link(s). The force sensor 306 can be configured to send the toggle force signal via a communication link to, for example, the controller 50/200 (shown in FIGS. 1A, 1B).

As seen in FIG. 4, the toggle mechanism 120 can be attached at one end to the adjustable cam 104 (shown in FIG. 2), which in turn has a portion connected fixedly to the frame 106. The cam 104 is adjustable (automatically or manually) to move the connected end of the toggle mechanism 120 with respect to the frame 106 and, thereby, the welding system 100. The cam 104 can be configured to operate as a fixed pivot of the toggle mechanism 120.

In various embodiments, the toggle mechanism 120 can be connected in the welding system 110 at one or more connection points, including to the cam 104 via the cam link 304. In the embodiment depicted in FIG. 4, the toggle mechanism 120 is connected at three points, including: coupled to the cam 104 via the cam link 304; coupled to the drive shaft 311 and actuator 102 via the actuator link 307; and coupled to a ram drive member 309 via the ram link 308. Specifically, the cam link 304, which includes the force sensor 306 as shown in the illustration on the right side of FIG. 4, is connected at one end to the cam 104 and at another end to the actuator link 307 and ram link 308; the actuator link 307 is connected at a first end to the cam link 306 and ram link 308 and at another end to the actuator drive shaft 311; and, the ram link 308 is connected at one end to the cam link 304 and actuator link 307 and at another end to the ram drive member 309. The ram drive member 309 can be coupled to the ram module 116 along a first side and coupled to the frame 106 along a second side and configured to be parallel to the output axis 314.

In various embodiments, the ram driver member 309 can be configured to travel with respect to the fame 106 or the ram module 116 along the output axis 314.

In certain embodiments, the ram drive member 309 can be connected directly, or through an intervening device (not shown), to the ram module 116 and/or the frame 106. The ram drive member 309 can be configured to move with the ram module 116, or to guide the ram module 116 as it moves, along the output axis 314.

The actuator link 307, which is pivotally coupled to one end of the link 308, can be configured to move along the input axis 310 and thereby force the link 308 to move along the input axis 310 and the output axis 314 and simultaneously pivot about its pivot axis PA since the other end of the link 308 is pivotally connected to the ram drive member 309.

As seen in the embodiment depicted in FIGS. 2-6, the welding system 100 can include a linear position sensor 204 for single (or multi) axis control of an adjustable geometry mechanism where variability in the output axis 314 position is important to setup or operation. During operation, the toggle mechanism 120 can be driven by the actuator 102 along the input axis 310, and the device 114 can move in a linear fashion along the output axis 314. The movement of the device 114 can be detected, measured, and monitored by the position sensor 204 (shown in FIG. 3) in real-time. Simultaneously (or at a different time), the position of the toggle mechanism 120 can be detected, measured, and monitored in real-time by the actuator position sensor 312, which can be integrated with the actuator 102.

In various embodiments, the actuator position sensor 312 can include, for example, a linear position sensor, a rotary encoder, a linear encoder, an optical encoder, or other sensor device capable of detecting and measuring displacement or movement of the drive shaft 311 and/or the actuator 102. The position of the device 114 along the output axis 314 can be determined by the position sensor 204, which in at least one embodiment includes a linear encoder attached to the ram 112 (shown in FIG. 2).

In various embodiments, an optimum operating position of the toggle mechanism 120 for treatment (for example, bonding, welding, soldering, fusing, or cutting) can be such that the cam link 304 and the ram link 308 are in-line, or within manufacturing tolerances to being in-line, with each other with respect to the output axis 314. The cam 104 can be configured and operated to adjust the geometry of the toggle mechanism 120 to accommodate variations in dimensions of the device 114 while maintaining alignment of the cam link 304 and the ram link 308 with respect to the output axis 314. For instance, the toggle mechanism 120 can be used with different types or sizes of horns 114, including horns 114 having different geometries, shapes, or dimensions.

In various embodiments, the controller 50/200 can be configured to monitor and detect unwanted cam movement. In certain embodiments, the controller 50/200 can monitor position signals from both position sensors 204 (shown in FIG. 3) and 312 (shown in FIG. 4) and detect if the cam moved from unwanted instantaneous high force or operator adjustment. If unwanted movement is detected, the controller 50/200 can generate a fault signal and stop machine operation.

Detecting and monitoring the real-time position of the toggle mechanism 120 along the mechanically variable output axis 314 allows for detection and verification of any adjusted geometry of the toggle mechanism 120, which can be outside of the control or direct observation of the welding system 100 or its operator. In various embodiments, the controller 50/200 (shown in FIGS. 1A, 1B) can be configured to receive an input axis position signal from the actuator position sensor 312 and an output axis position signal from the position sensor 204 (shown in FIG. 3). The controller 50/200 can be configured to generate a notification signal and/or to automatically adjust the geometry of the toggle mechanism 120 into alignment with the output axis 314 (shown in FIG. 4). The notification signal can include an alert to an operator indicating, for example, that a part of the machine is out of alignment and/or instructing the operator to adjust the toggle mechanism 120 until it is aligned with the output axis 314.

Before operation of the welding system 100 begins, the real-time position of the toggle mechanism 120 can be determined (for example, by the controller 50/200) to ensure repeatable production and reduce any line restarts. The toggle mechanism 120 can go out of alignment or otherwise need adjustment, such as, for example, where one or more parts or components in the welding system are accidentally or intentionally adjusted or altered by a user, improperly mounted or installed, become loose or the mounting is or becomes too flexible/compliant, are defective, or become worn, fail, or otherwise cease operating as intended.

By detecting, measuring, or monitoring any change in geometry of the toggle mechanism 120, the welding system 100 can adjust the geometry to ensure proper compensation for external forces or loads. For instance, changes in geometry of the toggle mechanism 120 can be detected and measured by the sensor module 40 (shown in FIG. 1), and the measurements used to adjust the geometry of the toggle mechanism 120, such as, for example, by operating the actuator 102 until the operating axis of the toggle mechanism 120 is parallel to the output axis 314. The operating axis of the toggle mechanism 120 can be parallel to the travel path of the device 114.

For example, referring to FIG. 4, the geometry of the toggle mechanism 120 can be adjusted by the cam 104, such as, for example, by an operator manually moving the cam handle 302 to cause the cam 104 to move one end of the toggle mechanism 120 along the input axis 310 until the operating axis of the toggle mechanism 120 is parallel with the output axis 314.

Referring to FIG. 3, each backlash compensation spring 202 (202a, 202b) can be configured to bias backlash in the direction of the working load, in parallel with the working load component along the output axis 314. The force exerted ($F_{Spring}$) by each backlash compensation spring 202 can be dependent on the linear position of one (or both) ends of the spring, such as, for example, with respect to the frame 106 or the ram 112. Accordingly, when measuring a load (for example, by the force sensor 306) at the cam link 304 and the ram link 308, the measured load is subject to the force exerted by the spring 202, which can be subtracted from the measured load, for example, by the controller 50/200 (shown in FIGS. 1A, 1B) to calculate the actual external load.

The controller 50/200 can be configured to calculate the actual external load by, for example, calculating the sum of all x-vector forces and all y-vector forces detected and measured by the force sensor 306 and subtracting the sum of y-vector backlash spring forces, which in the embodiment depicted in FIG. 3 is $2 \cdot F_{spring}$ since the backlash springs 202a, 202b are substantially the same and oriented so as to apply the backlash force along the output (or y-) axis 314.

Referring to FIG. 4, the force sensor 306 can be configured to detect and measure a force (F) comprising an x-vector force component ($F_x$) and a y-vector force component ($F_y$) that are transferred to the force sensor 306 via the actuator link 307 and/or the ram link 308. In an embodiment, the controller 50/200 (shown in FIGS. 1A, 1B) can calculate an external load ($L_{ext}$) by the following equation (1):

$$L_{ext} = F - 2 \cdot F_{spring} \qquad (1)$$

In many applications, the welding system 100 will be configured such that any external load ($L_{ext}$) will have substantially only a y-vector force component ($L_y$)—that is, the load will be substantially entirely along the output axis 314 (shown in FIG. 4). Since the force exerted by the two backlash springs mostly has only a y-axis component, the external load $L_{ext}$ can be calculated by the following equation (2):

$$L_{ext} = L_y = F_y - 2 \cdot F_{spring} \qquad (2)$$

Since the force F and load L are transferred to the actuator link 307 and/or the ram link 308, the force sensor 306 can be positioned near the actuator link 307 and/or ram link 308, such as, for example, within the cam link 304 (as seen in FIG. 4), where the aggregate of all forces and loads exerted on the toggle mechanism 120 can be measured by the force sensor 306. Thus, when measuring (by the force sensor 306) an external load $L_{ext}$ that is applied to, for example, the device 114, forces or loads experienced internally such as, for example the force exerted by each backlash spring 202 must be removed or compensated for to get an accurate measurement.

Referring to FIG. 3, the position sensor 204 can be configured to detect and measure the real-time position of the toggle mechanism 120 and/or energy stack (including the device 114) along the output axis (or y-axis) 314 at any point in time and generate an output axis position signal. The actuator position sensor 312 (shown in FIG. 4) can be configured to detect and measure the real-time position of the toggle mechanism 120 and/or energy stack (including the device 114) along the input axis (or x-axis) 310, at the same or a different time as the position is measured by the position sensor 204. Based on the real-time output axis position signal from the position sensor 204 and the real-time input axis position signal from the actuator position sensor 312, the real-time geometry of the toggle mechanism 120 can be detected and the sensor signals used to determine an adjustment value for the cam 102 to align the toggle mechanism with the output axis 314.

An effective mechanical advantage of the toggle mechanism 120 can be dependent upon a narrow window of operating positions of the toggle mechanism 120 and, thereby, the energy stack, including the device 114. The toggle mechanism 120 (and thereby the energy stack) can be maintained within the narrow window of operating positions by monitoring the output axis position signal and the input axis position signal and adjusting the toggle mechanism 120 when it exceeds either end of the window of operating positions. In certain embodiments, the window of operating positions can be set to, for example, a linear operating range of 600 μm to 1000 μm within the max obtainable linear position to ensure proper operation of the welding system 100. Thus, when the geometry of the toggle mechanism 120 is determined to exceed either end of the window of operating positions, the cam 104 can be operated to adjust the geometry and return the toggle mechanism 120 to a default position, in which the operating axis of the toggle mechanism 120 is substantially parallel to the output axis 314.

The window of operating positions can be exceeded at either of its ends in real world applications of the welding system 100. For example, a violation of the minimum threshold can result in an unnecessary force being transmitted from the output axis 314 to the input axis 310 and the force being poorly translated into the link(s) that contain the force sensor 306 (shown in FIG. 4); and a violation of the maximum threshold can occur such as in "over center" conditions where increased positions along the output axis 314 positions (and therefore working force) cannot be obtained or controlled by the welding system 100 due to the inversion of the toggle mechanism 120, where the direction of motion of the output axis becomes opposite of the direction of the motion of the input axis. By monitoring the first and second position sensors, the inversion point can be identified when positive motion (advancement) on the input axis results in negative motion (retraction) on the output axis. Both violations indicate that the ram 112 is out of alignment and that mechanical adjustment of the toggle mechanism 120 is necessary, with the violation of the maximum threshold possibly indicating that mechanical adjustment of the toggle mechanism 120 has become necessary, for example, due to component wear. In various embodiments the controller 50/200 is configured to generate an alarm when the travel path exceeds a predetermined threshold, such as, for example, when the toggle mechanism is beyond its inversion point or the travel path is 600 μm, 1000 μm, or greater, past full stroke of the welding device with respect to the input axis.

Real-time sensor data representing the linear position or displacement of the ram 112 during each treatment (for example, a bonding operation, a welding operation, a soldering operation, a fusing operation, or a cutting operation) can identify out-of-specification operation not observable from the force sensor signal alone, such as, for example, the real-time sensor data signal from the force sensor 306 (shown in FIG. 3). This can happen, for example, due to component wear or replacement, a change in processed or raw material, mechanical adjustment, device settings, or any combination thereof. As a result, detection and measurement of the position and movement of the ram 112 by the position sensor 204 can be used to ensure consistency.

Additionally, where the welding system 100 is included in two or more machines, the combination of the force signal from the force sensor 306 and the position signal from the position sensor 204 can be used to maintain consistency in operation from machine to machine by maintaining the toggle mechanism 120 and, thereby, the ram 112 in proper alignment, even though variations exist between the machines, such as, for example, due to manufacturing tolerances or misalignment resulting from improper shipping, assembly or installation. The welding system 100 is configured to provide optimal performance, including under varying operating conditions or when switching products (for example, to be bonded, welded, soldered, fused, or cut), by ensuring alignment of the ram 112 and device 114 with the output axis.

The present disclosure also contemplates precision positioning during setup using user definable linear offsets. The "Goto Stack Alignment Position" feature will extend the ram to a user fixed linear offset, which is just short of (for example, by 100 μm) the known maximum displacement. This represents an optimized operating position, and once the ram is in this position mechanical alignment can be done with repeatable results. The "Find Dynamic Ready Position" feature will extend the ram until a force signal is encounter representing the displacement needed to reach the operating position given the current mechanical alignment. The ram will then retract a user definable linear offset from that position, providing consistent timing at weld cycle start up.

In various embodiments, the actuator 102 (including sensor 312) can include a combination of a servomotor with encoder feedback and the position sensor 204 can include a linear encoder. In those embodiments, the welding system 100 can monitor the relationship of the actuator position sensor 312 to the linear encoder 204 to detect and measure alignment of the ram 112. If there are any changes outside of a predetermined band, such as, for example, the toggle mechanism 120 (or ram 112) being out of alignment enough to cause a difference in the expected linear position with respect to the output axis 314 (shown in FIG. 4), then a fault can be detected or determined and an alert signal generated and an alert issued to the operator to indicate that the actuator 102 is out of adjustment and needs to be adjusted. This can happen, for example, when rogue material that's too thick is presented between the device 114 and an anvil 115 (shown in FIGS. 13A, 13B).

The welding system 100 can also detect overtravel of the actuator 102 and/or the actuator drive shaft 311. For example, referring to FIG. 4, if the actuator link 307 is extended too far, the linkage will invert, which may keep the drive shaft 311 moving but not move the ram 112 any further. State-of-the-art systems can run past the linkage inversion point and become damaged, whereas the weld system 100 has a safety function with overtravel detection via the actuator position sensor 312 and/or the position sensor 204 and a process for overtravel detection and alert signal generation, issuing an alert of a fault condition such as, for example, the actuator 102 or cam 104 being out of adjustment. The welding system 100 is configured to provide detection of actual linear displacement of the device 114 and generation of an alert signal thereof, which allows the welding system 100 to inform the operator when a component (for example, a linkage) in the toggle mechanism 120 needs to be repaired or replaced, or when overtravel is detected.

In various embodiments, the alignment adjustment and correction of the toggle mechanism 120 can be automated, in which case the controller 50/200 can be configured to receive the various sensor signals, including the input axis (or x-axis) position signal from the actuator position sensor 312 and/or the output axis (or y-axis) position signal from the position sensor 204, and generate a cam adjustment drive signal to drive the adjustable cam 104 to a point at which the toggle mechanism 120 (or ram 112) is substantially parallel with the output axis 314.

The system 100 is configured to monitor operation of its various components, including the actuator 102 and the toggle mechanism 120, and when a predetermined condition occurs, such as, for example, a predetermined number of mils/micrometers of mechanical play is noticed in the linkages (for example, cam link 304, actuator link 307, ram link 308, or a combination thereof), the system 100 can generate and provide a shutdown warning or alarm that the machine needs to be serviced. The operator can be notified that maintenance is required or advised to shut down the machine.

In various embodiments in which the geometry adjustment is automated, the controller 50/200 can be configured to monitor operation of the various components in the welding system 100, including the actuator 102 and the toggle mechanism 120, and when a predetermined condition occurs, such as, for example, the predetermined number of mils/micrometers of play is noticed in the linkages, the controller 50/200 can stop operation, generate and provide a shutdown warning or alarm that the machine needs to be serviced, and automatically adjust the actuator 102 and/or the toggle mechanism 120 to adjust the geometry into alignment, for example, by aligning the toggle mechanism 120 with respect to the output axis 314. The operator can be notified that maintenance is required or advised regarding the status of the maintenance as it is performed automatically. In certain embodiments the controller 50/200 can be configured to hold the actuator 102 at a linear position that is near metal-to-metal contact, such as, for example, between 10 μm and 1000 μm of having metal-to-metal contact, or 100 μm or less in at least one embodiment.

In various embodiments, the force sensor 306 (shown in FIG. 4) might require periodic re-calibration. The welding system 100 can be configured to perform force calibration for the full force range of the sensor without requiring the removal of the thruster assembly TA from the machine, or the removal of the device 114 from the ram 112. Without this configuration of the system 100, it would be necessary to remove the thruster assembly TA from the machine to calibrate the force sensor 306, which is a time-consuming and labor-intensive task. Compared to the state-of-the-art ultrasonic welding machines, the welding system 100 provides a significant reduction in the time to perform calibration of a force sensor, as well as elimination of any need to re-level the device 114 once calibration is complete.

Figure 5:
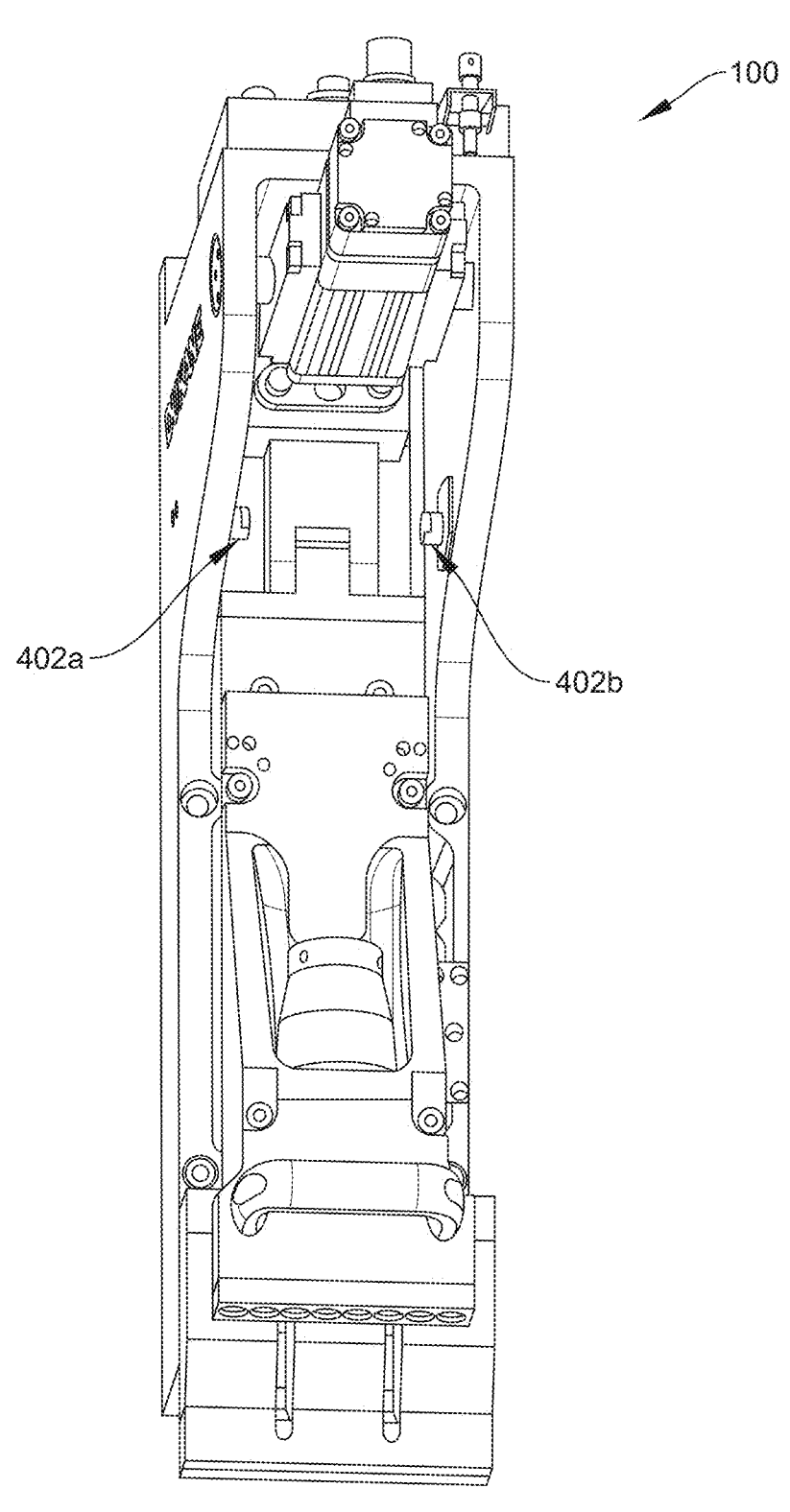
FIG. 5 shows an embodiment of a thruster that can be included in the welding system of FIG. 1.
Figure 6:
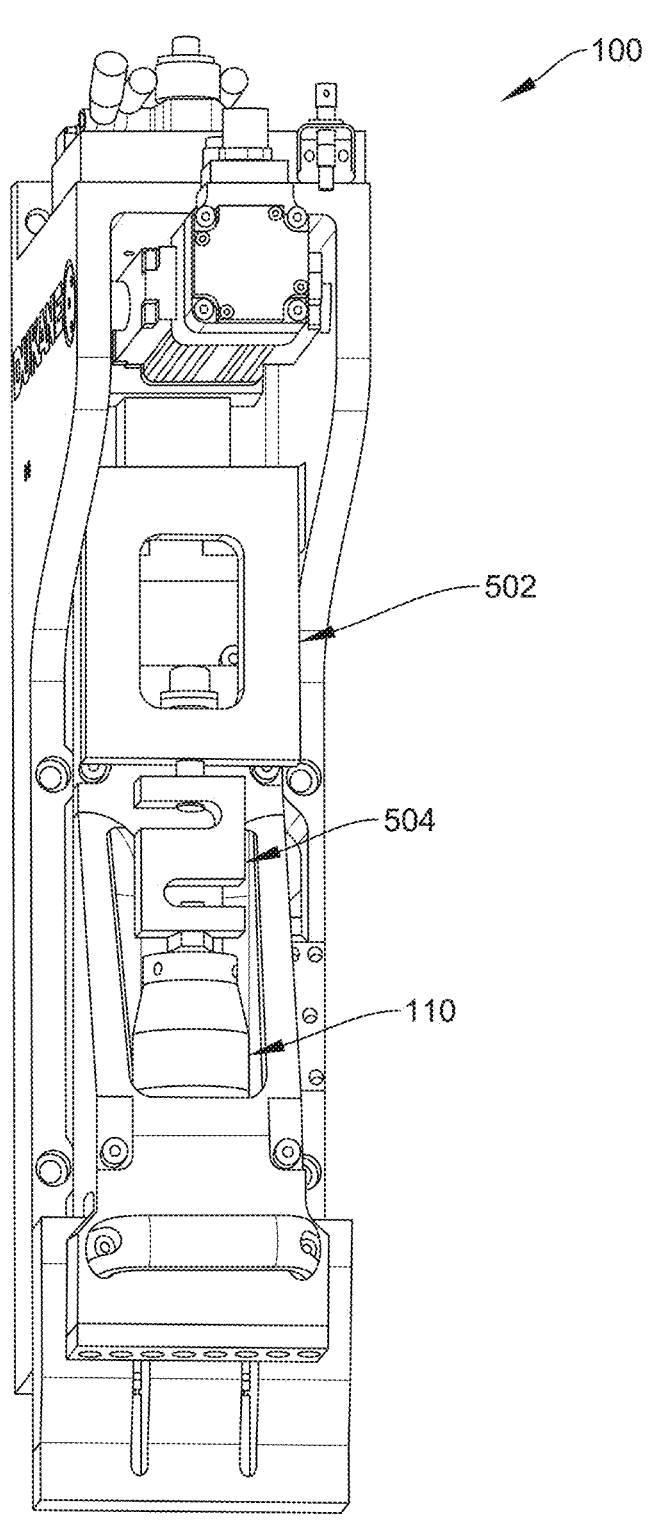
FIG. 6 shows calibration components that can be included in the welding system of FIG. 1.

FIGS. 5 and 6 show different views of a calibration system that can be included in the welding system 100. FIG. 5 shows a view of the welding system 100 including a pair of calibration protrusions 402 (402a, 402b) attached to or formed as part of the frame 106. The protrusions 402a, 402b can include, for example, shafts, half shafts, pins, rods, clips, screws, bolts, nuts, or the like. In the embodiment depicted in FIG. 5, the protrusions 402a, 402b each include a half shaft. The transducer 108 is removed/hidden in FIG. 5 for ease of illustration.

FIG. 6 shows a tension block 502 and a calibration load cell 504 attached between the frame 106 and the booster 110. The tension block 502 can have any shape that facilitates easy and secure installation between the frame 106 and the booster 110 (or device 114), with the calibration load cell 504 installed between the tension block 502 and the booster 110 (or device 114).

Referring to FIGS. 5 and 6, a force calibration process can be performed by first removing the transducer 108 from the thruster assembly TA. The tension block 502 can then be placed over the half shafts 402a, 402b, and the calibration load cell 504 can be attached between the tension block 502 and the booster 110 (or the device 114) by attaching an end of the calibration load cell 504 to a portion of the tension block 502 and an opposite end of the calibration load cell 504 to a portion of the booster 110 (or the device 114). The toggle mechanism 120 can then be extended to a predetermined position, such as, for example, the same position of the toggle mechanism 120 during operation. As a force F is applied along the input axis 310 (shown in FIG. 4), a compressive load is produced in the force sensor 306 (shown FIG. 4) and a tension load is produced on the calibration load cell 504. The force signals from the force sensor 306 and the calibration load cell 504 can be sampled for different input axis forces and a table populated in the controller 50/200, which then correlates the calibration load cell force with the sensor force. During operation, the force applied by the device 114 is determined by referencing the sensor force readings against this calibration table stored in the controller 50/200, including interpolation between table points.

In at least one embodiment, the controller 50/200 (shown in FIGS. 1A, 1B) is configured to execute instructions to provide for metal contact detection and alert signal generation, including generating a warning signal when there is metal contact and sending (for example, via the IO interface 230 or communication unit 240) the warning signal to an output device (not shown) such as a human-machine interface (HMI) (for example, a touchscreen display device) to display a warning to an operator. If the warning or a set of warnings is ignored or not resolved and the metal contact worsens, then a fault can be determined by the controller 50/200 and a fault signal can be generated and sent to the output device (not shown). Using the HMI, an operator can interact with the controller 200 to set limits on when a warning condition or a fault condition is determined, including to set error limits. The controller 50/200 can be configured to receive commands, via the HMI, including to set a warning setpoint such as, for example, percentage of setpoint deviation for ultrasonic amplitude, ultrasonic frequency, ultrasonic lock quality, or mechanical position. By monitoring ultrasonic frequency output of the ultrasonic generator (not shown), its Standard Deviation (StD) could be calculated and monitored. Once a metal-to-metal contact occurs, StD value will increase abruptly. Specific value of the frequency StD is applications dependent—horn size, speed, anvil details, non-woven materials properties and force all affect such values. For most applications the increase in StD is expected to be in 10%-200% range, or greater.

Frequency Lock Quality is a measure of the volatility of the frequency regulation function of the welding system 100. It is an error signal representing how accurately the synthesized output frequency matches the ultrasonic feedback. The frequency regulation works to minimize this value. Elevated levels of error, either temporary or sustained, indicate a mismatch between the control response and environment. For a given frequency regulation tuning and operating environment, Lock Quality will be largely consistent and predictable. The differences in these Lock Quality values for known operating environments, for example, with or without the presence of horn-to-anvil contact, can be compared to determine which operating environment is currently present. For Frequency Lock Quality its Standard Deviation value increase could also be used to detect metal-to-metal contact. For most applications the increase in Frequency Lock Quality StD is expected to be in 10%-200% range, or greater.

In certain embodiments, the weld system 100 can include a controller 200 configured for a sub state of a weld operation that provides for rapid position change to create space for a splice in material. To perform such a quick move, the controller 200 can be configured with a separate set of tuning parameters, and upon completion of the movement immediately re-enter the weld state using state information from before the splice move started, including BBT and ACAR adaptations. This minimizes the wasted parts associated with a material splice. The controller 200 equipped with BBT is aware of the splice move state and pauses the bond detection operation (such as, for example, the process 900, shown in FIG. 10) while in a known retracted unloaded position. The splice move can be synchronized to the inter-bond idle period. The controller 200 can be configured to receive user programmable splice distance inputs, which can be specified in linear encoder units, and provide predictable/measurable minimized nip gaps for the thicker splice material to pass.

Bond Balance Technology (BBT)

The welding system 100 (or workstation 1, shown in FIG. 1A) can be configured for characterization of individual bonds of a dual bond anvil pattern in an intermittent bonding application using no external anvil position/angle feedback sensors. As discussed above with reference to FIG. 1A, the welding system 100 can include first and second treatment modules 10, 20, either of which can include a welding device such as the device 114 or an anvil 115 (for example, shown in FIG. 13A, or 13B). In various embodiments, the welding system 100 can include the Bond Balance Technology (BBT) that can be particularly useful for short-time intermittent bonding applications, as well as for continuous bonding applications.

In the welding system 100, the linear operating position of the ram 112 can be used to adjust an applied force of the device 114. For example, to adjust a linear operating position, the device 114 maybe backed away from the anvil 115 slightly to reduce a noise signal. The device 114 can be backed off until metal (horn-anvil) contact goes away.

FIGS. 13A and 13B show two nonlimiting embodiments of a horn-anvil combination that can be included in the welding system 100 (or workstation 1, shown in FIG. 1A) for treating a workpiece 60. As seen, the anvil can include a rotary anvil 115 having one or more welding features 115-1, 115-2, . . . , or 115-n, where n is a positive integer greater than 2. Each welding feature 115-n can include a contact portion, a row, a column, or a ridge having notches and lands or protrusions, as understood by those skilled in the art. Each welding feature 115-n can be configured to contact with the device 114 to form a bond.

The welding system 100 can be configured to automatically back off a position by increasing the distance of the anvil 115 from the device 114 based on a signal indicating metal contact. In various embodiments, metal contact between the device 114 and the anvil 115 can be detected based on, for example, the force signals received from the force sensor 306 (shown in FIG. 4) and/or the linear position sensor 204 (shown in FIG. 3) without using any external metal conductivity sensors at the device 114 or the anvil 115.

In various embodiments, the welding system 100 (or workstation 1) is configured to process operational data, including peak force, average force, bond period and duration, and ultrasonic power/energy. The welding system 100 can control bond force toward a selectable reference/feedback force of overall bond peak force or the average of the peak forces of the individual bonds for intermittent applications, and variable force for continuous applications. The welding system 100 can provide transparent operation between anvil designs with any number of identical bonds per rotation without adjustment of any manual settings, supporting any bond duty cycle. The welding system 100 features automatic built-in cycle rate detection without requiring any external sensors.

Figure 7A:
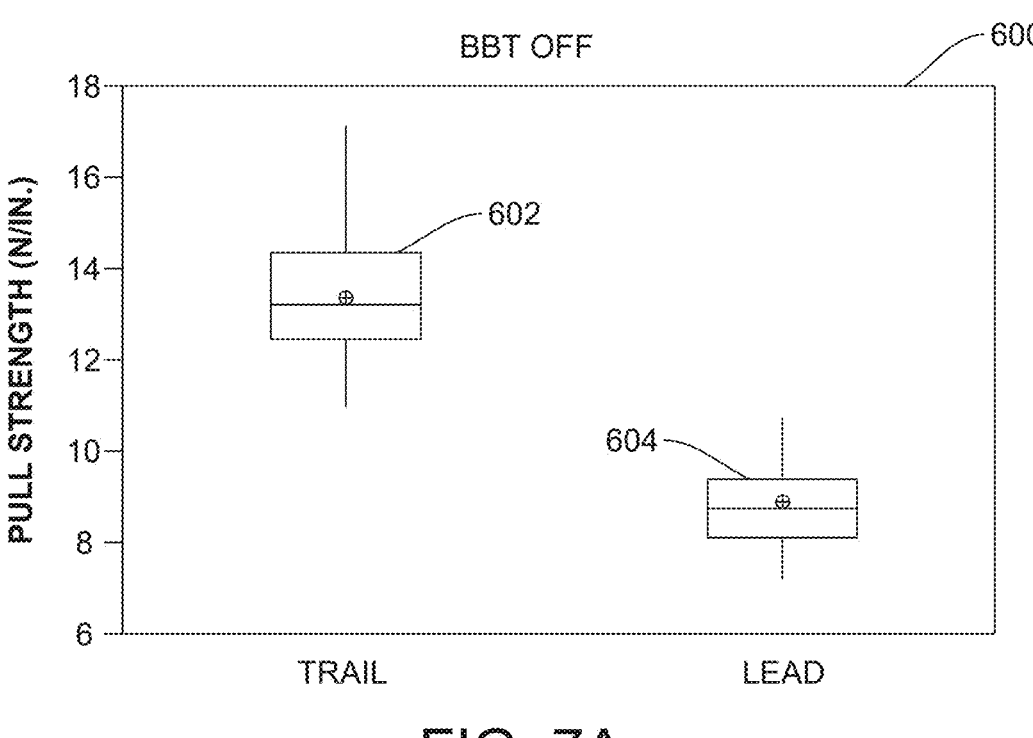
FIGS. 7A and 7B show two different tensile strength plots from trailing to leading edges, including without Bond Balance Technology (BBT) in FIG. 7A and with the BBT in FIG. 7B.
Figure 7B:
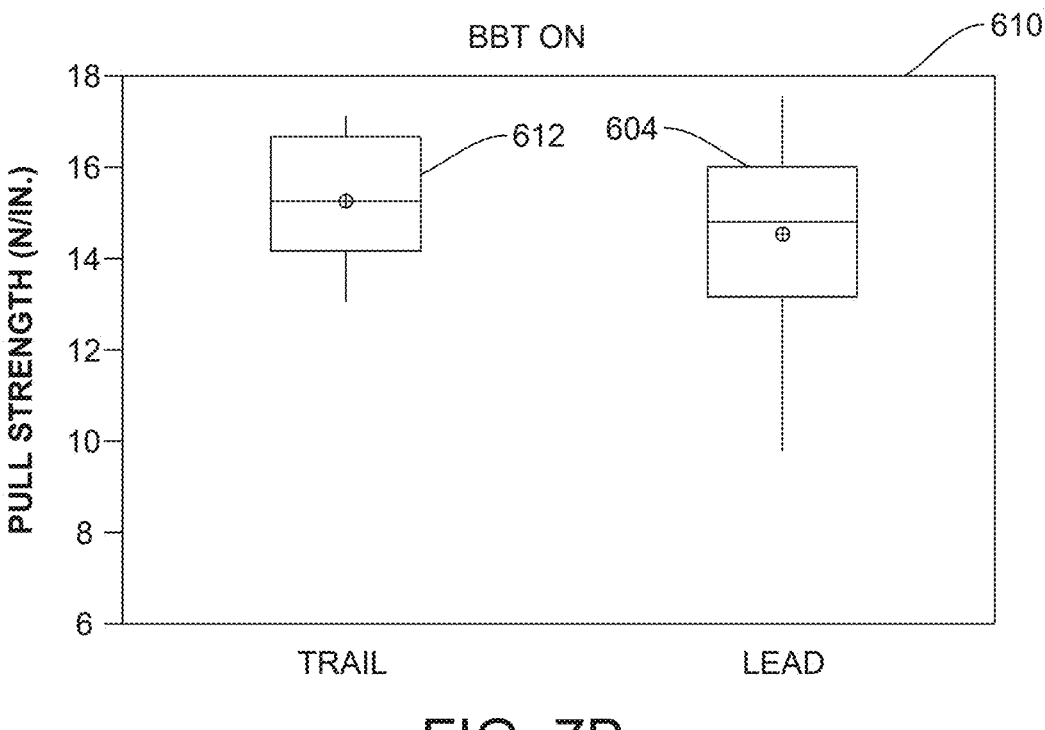

FIGS. 7A and 7B show two different tensile strength plots from trailing to leading edges without BBT operations (FIG. 7A) and with BBT operations (FIG. 7B) performed by the welding system 100, for example, equipped with the anvil 115 with two welding features 115-1, 115-2 (shown in FIG. 13A) for illustration purposes. In various embodiments the trailing edge 602/612 corresponds to a trailing edge portion of a workpiece 60 (or unit of a workpiece) and the leading edge 604/614 corresponds to a leading edge of adjoining workpiece 60 (or unit of the workpiece), with a process cycle rate (or production speed) of, for example, 150, 175, 200, or more workpieces (or units of workpieces) per minute, including welding, bonding, fusing, and/or cutting. As can be seen in FIG. 7A, the bond strength variability between trailing-leading portions of workpieces 60 can be high, wherein the tensile strength of a trailing edge 602 of a bond is significantly higher than a corresponding tensile strength of a leading edge 604—for example, a pull strength difference of about 3 Newtons/inch (N/in.). However, with the BBT operations performed, as seen in FIG. 7B, the bond strength variability is significantly reduced, wherein the tensile strengths of a trailing bond 612 versus a leading bond 614 are nearly the same. As seen in FIGS. 7A and 7B, by performing BBT operations (for example, via the controller 50) bond strength variability can be reduced significantly. For instance, before a BBT operation (FIG. 7A), the bond strength (for example, as measured by pull strength) of the trailing edge 602 of a workpiece 60 can be, for example, between 11.0 and 16.4 Newtons-per-inch (N/in.) and the leading edge 604 of the adjoining workpiece 60 can be, for example, between 7.2 and 10.8 N/in.; and with the BBT operation ON (FIG. 7B) the bond strength variability is reduced such that the bond strengths of the trailing edge 612 and leading edge 614 are similar, for example, the bond strength (for example, as measured by pull strength) of the trailing edge 612 of the workpiece 60 can be, for example, between 13.0 and 17.2 N/in. and that of the leading edge 614 of the adjoining workpiece 60 can be, for example, between 9.8 and 17.6 N/in. It is noted that an "edge" also means a bond and the terms are used interchangeably.

Table 1 below illustrates some example outcomes for BBT operations OFF (or deactivated) versus BBT operations ON (or activated). An 86% improvement can be seen in bond consistency when BBT operations are turned on compared to a state-of-the-art process.

TABLE 1

| Settings Used | Amplitude | Speed (ppm) | Speed (mpm) | Force (N) | BBT |
|---|---|---|---|---|---|
| Code 1 | 100% | 250 | 150 | 3000 | OFF |
| Code 2 | 100% | 250 | 150 | 3000 | ON |
| Code 3 | 100% | 250 | 150 | 3000 | OFF |
| Code 4 | 100% | 250 | 150 | 3000 | ON |

| Code 1 | Trail (N/in.) | Lead (N/in.) | Code 3 | Trail (N/in.) | Lead (N/in.) |
|---|---|---|---|---|---|
| REP 1 | 13.6 | 9 | REP 1 | 14.4 | 9.8 |
| REP 2 | 13 | 9.2 | REP 2 | 13.4 | 9 |
| REP 3 | 12 | 9.4 | REP 3 | 12.8 | 7.2 |
| REP 4 | 13.6 | 9.4 | REP 4 | 12.4 | 8 |
| REP 5 | 12.4 | 9.6 | REP 5 | 17.2 | 8.6 |
| REP 6 | 11 | 8.4 | REP 6 | 13 | 7.8 |
| REP 7 | 11.4 | 8.8 | REP 7 | 16.4 | 8 |

TABLE 1-continued

| | | | | | |
|---|---|---|---|---|---|
| REP 8 | 14.8 | 10.8 | REP 8 | 14 | 8.2 |
| REP 9 | 9.4 | 7.4 | REP 9 | 14.2 | 10 |
| REP 10 | 13 | 10.8 | REP 10 | 15.4 | 8.8 |
| AVG | 12.42 | 9.28 | AVG | 14.32 | 8.54 |
| DIFF. | | 25.28% | | | 40.36% |

| CODE 2 | Trail (N/in.) | Lead (N/in.) | CODE 4 | Trail (N/in.) | Lead (N/in.) |
|---|---|---|---|---|---|
| REP 1 | 16.6 | 15.2 | REP 1 | 15.2 | 12 |
| REP 2 | 16.4 | 17.6 | REP 2 | 16.6 | 14.8 |
| REP 3 | 15.6 | 15 | REP 3 | 14.6 | 14.4 |
| REP 4 | 14.2 | 14.6 | REP 4 | 14.2 | 14.2 |
| REP 5 | 17.2 | 17.2 | REP 5 | 16.8 | 9.8 |
| REP 6 | 16.8 | 17 | REP 6 | 16.2 | 16.6 |
| REP 7 | 16 | 15.8 | REP 7 | 13.8 | 12.2 |
| REP 8 | 14.2 | 16.4 | REP 8 | 13 | 12.6 |
| REP 9 | 13 | 15.6 | REP 9 | 17.2 | 13.2 |
| REP 10 | 13.6 | 14.8 | REP 10 | 14.8 | 13.2 |
| AVG | 15.36 | 15.92 | AVG | 15.24 | 13.30 |
| DIFF. | −3.65% | | | | 12.73% |
| | IMPROVEMENT | 86.16% | | | |

In various embodiments, the BBT operation (for example, performed by the controller 50/200) includes: receiving a force signal at each of the trailing edge 602/612 and the leading edge 604/612 of the workpiece(s) 60; determining (for example, by the controller 50/200) the force on the treatment module 10 (or 20, shown in FIG. 1), including the peak force value for the trailing edge 602/612 and the peak force value for the leading edge 604/614; determining an average of the two peak force values; determining an operation adjustment value for the treatment module 10 (or 20); and automatically applying (for example, by the controller 50/200) the operation adjustment value to increase, decrease or maintain the force applied to the workpiece(s) 60. The operation adjustment value can include, for example, an amount of force to be applied to the workpiece(s) 60.

Figure 10:
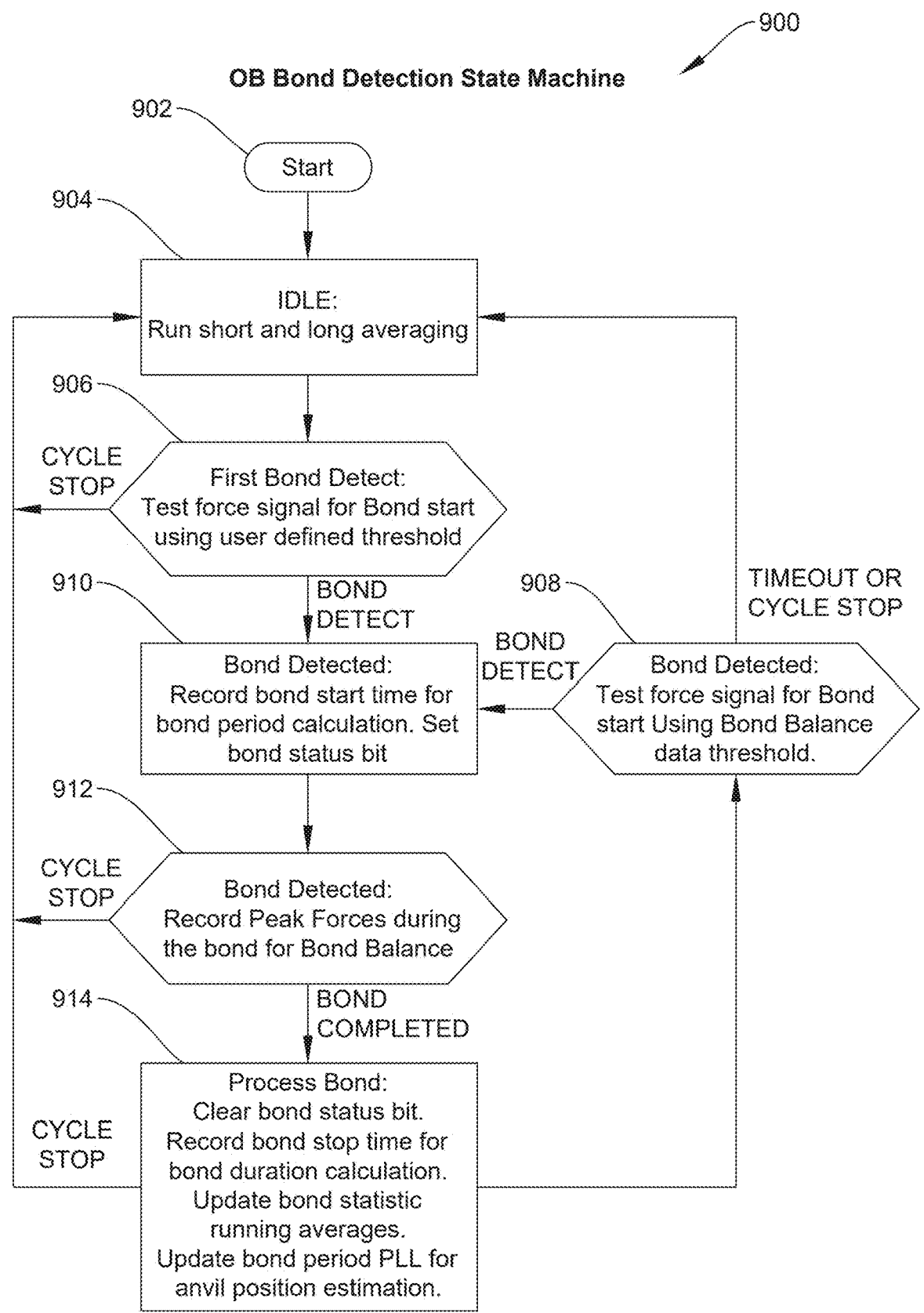
FIG. 10 shows a bond detection process, according to the principles of the disclosure.

FIG. 10 shows an embodiment of a process 900 for detecting bond properties during an ultrasonic welding operation. The process 900 can be performed by, for example, the welding system 100 equipped with the controller 50/200 (shown in FIGS. 1A, 1B).

Initially, the process 900 starts in an idle state (Step 902) and runs short and long averaging of the force signal in the idle state (Step 904). Short averaging periods are on the order of single digit milliseconds, and long averaging can range from 100's of milliseconds to multiple seconds. Averaging time can be chosen empirically based on specific application needs (speed, force, material properties) to optimize the weld quality. When a bond cycle starts, a force signal is tested for the bond start using a user-defined threshold (Step 906). If a bond is detected, the bond start time is logged and recorded for bond period calculation, and a bond status bit is set (Step 910), otherwise the process continues to run short and long force averaging (Step 904).

During the bond duration, peak forces can be detected and recorded for bond balance (Step 912). When the bond has been completed, the state moves to a process bond state in which the bond status bit is cleared, the bond stop time is logged and recorded for bond duration calculation, bond statistic running averages are updated, and bond treatment period and duration are updated for the detection of the treatment position in time (Step 914). The process returns to a bond detect state to test the force signal for the bond start using bond balance data threshold (for example, instead of a user-defined threshold) (Step 908).

FIG. 9 shows the force signal 804 of a typical anvil pattern preforming two bonds per cycle. One can see an imbalance in the peak force values of the two anvil contact points 806 and 809. Existing embodiments only sample the overall peak and regulate to that maximum, in this case 809. Bond Balance Technology (or BBT) recognizes the individual peaks, records their values, and averages one or more of these values to determine the force regulation reference value.

Figure 12:
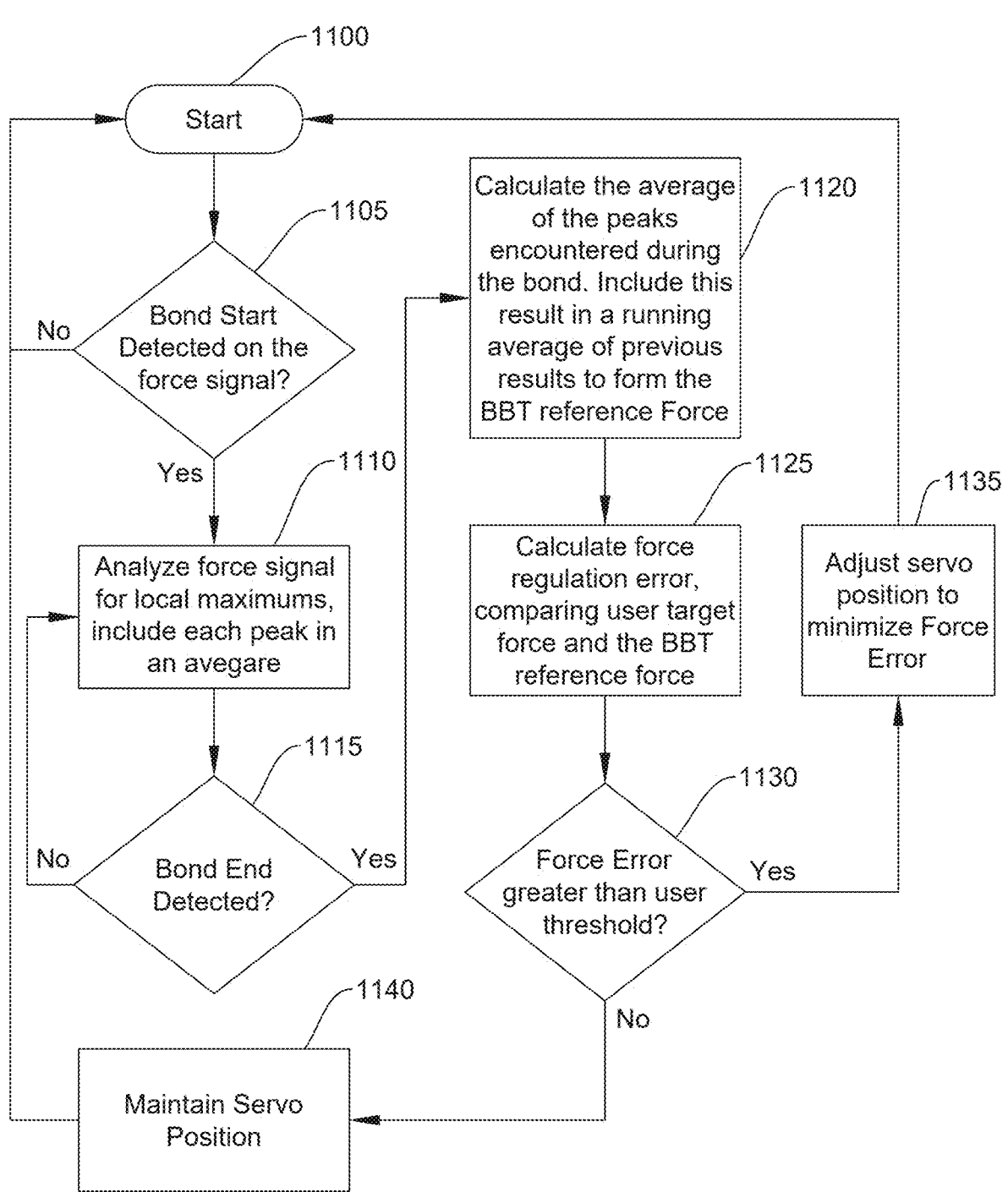
FIG. 12 shows a Bond Balance Technology (BBT) process, according to the principles of the disclosure.

In the embodiments of the welding system 100 (or workstation 1) equipped with BBT, the system 100 (or workstation 1) can be configured to perform the process 1100 seen in FIG. 12. During process 1100 can be performed, for example, in an intermittent bonding application or a continuous bonding application. Referring to FIGS. 12 and 13 together, the controller 200 (or 50) is configured to receive a force signal and detect (for example, by the processor 210) for a start of a bond based on the force signal (Step 1105). If a bond start is detected (YES at Step 1105), then the force signal is analyzed (for example, by the processor 210) for local maximums, including each bond force peak in an average of bond force peaks (Step 1110); otherwise (NO at Step 1105) the process continues to monitor and detect for bond starts (1105). The results of the force signal analysis (Step 1110) are monitored (for example, by the processor 210) to detect the end of the bond (Step 1115).

If bond end is detected (YES at Step 1115), then the average of the bond force peaks encountered during the bond can be calculated, for example, by the processor 210 (Step 1120); otherwise (NO at Step 1115) the process continues to monitor the analyzed force signal (Step 1110) to detect a bond end. The average of the bond force peaks can be included in a running average of previous results to form a BB reference force (Step 1120). In various embodiments the controller 200 (or 50) is configured to detect and recognize each individual bond force peak (for example, by the processor 210), record a value for each bond force peak, and average two or more of the values to determine a force regulation, or position regulation reference value.

A force regulation error can be calculated (for example, by the processor 210) based on the BBT reference force (Step 1125) by comparing a predetermined target force (for example, preset by a user) and the BBT reference force value. Based on the calculated force regulation error, an operating condition can be determined (for example, by the processor 210), such as whether the force regulation error is greater than a predetermined threshold value, for example, preset by the user (Step 1130). If an operating condition is determined in which the force regulation error is greater than the threshold value (YES at Step 1130), then the servo position of the treatment module 10 (or 20, shown in FIG. 1) can be adjusted to minimize the force regulation error (Step 1135); otherwise (NO at Step 1130) the servo position can be maintained (Step 1140). The process 1100 can continue and repeat Steps 1105 to 1140 for each bond.

In the course of characterizing and collecting data for the bond force peak average calculation, a bond force span value is also calculated as the difference in the minimum and maximum peak values encountered during the treatment. This signal serves as a bond balance error signal to be monitored for process consistency.

As evident from the above descriptions, advantages of the welding system and processes according to the instant disclosure include, but are not limited to: bond strength variability less than 10%; both sides (leading and trailing) of a bond are near equal, no more weak or uneven bonds; faster sampling rates, taking an average of peaks instead of sampling to peak force; automatic cycle rate detection doesn't require external cycle rate feedback; actuator out of adjustment detection and correction using dual encoder feedback; actuator overtravel detection; automatic maintenance required warning for mechanical actuation linkage; actual linear displacement of the horn; and specific embodiments configured for intermittent bonding applications; metal contact detection without any need for external sensors.

Adaptive Cyclic Amplitude Regulation (ACAR)

In various embodiments, the welding system 100 can include Adaptive Cyclic Amplitude Regulation (ACAR). In at least one embodiment, the controller 200 (shown in FIG. 1B) is configured to execute instructions to perform ACAR operations as described herein.

ACAR provides improved ultrasonic amplitude regulation, and power delivery, to the workpiece 60 (shown in FIG. 1A, 13A, or 13B), during the abrupt introduction, and throughout the duration, of heavy ultrasonic loads encountered during repetitive intermittent bonding applications with a physically fixed bond duty cycle determined by anvil geometry. This works toward reducing ultrasonic amplitude sag, such as, for example, might be associated with near instantaneous changes in load, by using the regulation output of previous bonds to predictively anticipate the current bond. State-of-the-art control techniques such as PID (proportional-integral-derivative) only retroactively respond to the feedback signal. Such state-of-the-art approaches, however, are not suitable for high bond rate or high load applications with short bond durations. In various embodiments, the welding system 100 uses distinctly different control techniques during the unloaded or idle sonics period between bonds and the bonds themselves.

In the embodiments of the welding system 100 (or workstation 1, shown in FIG. 1A) equipped with ACAR, the system can be configured to adapt to the ultrasonic load encountered during individual bonds by, for example, the processor 210 (shown in FIG. 1B) analyzing the system's performance from previous bonds. The controller 50/200 can continuously adapt to the shape of the load (for example, workpiece 60, shown in FIG. 1A, 13A, or 13B), applying more or less excitation energy throughout the following or subsequent welds. The controller 50/200 can be configured to accommodate bond patterns of any shape or number of anvil contact points per bond, such as, for example, the welding features 115-1 to 115-*n*, shown in FIGS. 13A and 13B.

The welding system 100 can include one or more "non-sonic" device sensors (not shown), the outputs of which can be used by the controller 200 to determine the position, period, and duration of the bond, or closely grouped set of bonds. In the embodiment depicted in FIGS. 2-6, the controller 200 can use the force signal received from the force sensor 306 (shown in FIG. 4). In various embodiments, the welding system 100 can include and use linear position and/or ultrasonic power. The welding system 100 can be configured to data acquisition rates that far exceed update rates of state-of-the-art networked machine controllers (motion control protocols/controllers excluded). This aids in identifying machine variability not visible to existing systems. This variability can be present in advanced machine designs using festooning techniques to protract the bond duration, or "multi-up" anvil designs with multiple bond landing locations.

In various embodiments, immediately before a bond is expected by the controller 200, there is a short period of "pre-boost" that ramps up ultrasonic amplitude in anticipation of the ultrasonic load step function. This counteracts the loss of inertia/momentum in the energy stack comprising the device 114 that otherwise cannot be accounted for due to physical system frequency response to changes in excitation energy. Ultrasonic amplitude can be measured and monitored by the controller 200 to ensure safe operating conditions for the stack are maintained during this short undamped period of time. The controller 50/200 can anticipate, for this phase of ACAR control, small changes/jitter in the timing of the start of the bond, wherein ACAR control can enter the bond phase early if it is detected earlier than expected. ACAR control can have a maximum "boost" level that it will maintain for a short period if the bond/load arrives later than expected. ACAR implementation eliminates nuisance overloads by reducing amplitude peaks (voltage overloads), which increases equipment reliability and increases transducers lifetime. It also increases the practical range of bonding forces. ACAR implementation also improves bonding of thin non-woven materials that are more sensitive to over-welding due to unwanted amplitude spikes.

During the bond, many/multiple areas of amplitude regulation can be established and distinctly controlled from each other by the controller 50/200. These areas can be automatically reduced or expanded by the controller 50/200 to match the bond duration as line rates change.

Similar to pre-boost, the ACAR control can be configured for a "post boost" phase that reduces amplitude overshoot as the bond finishes and the large ultrasonic load/damping suddenly disappears. Excitation energy is removed proactively allowing resonant mechanical inertia to dissipate into the workpiece 60 (shown in FIG. 1A, 13A, or 13B) and complete the bond.

The controller 50/200 configured with ACAR automatically adapts to ultrasonic load changes due to line rate changes, target weld force changes, and/or material changes without user interaction, using no external sensors or machine state information. The controller 50/200 can optionally provide bond rate information to the welding system 100. This improves line rate change response during high levels of acceleration and/or deceleration, provided the controller 50/200 information update rate is acceptable and accurate. The controller 50/200 can be configured to compare/cross check the information updates to its own analysis of the machine state. Alternatively, the controller 50/200 can be configured to operate stand alone, without information updates if unavailable due to legacy machine constraints or other conditions.

In an embodiment, the controller 50/200 can be configured with ACAR intended for continuous pattern rotating anvils, or applications where the material traverses a non-rotating anvil, which do not exhibit large changes in force per treatment. As discussed above, with reference to FIG. 1A, the first treatment module 10 can include a rotating anvil (for example, anvil 115, shown in FIGS. 13A, 13B) and the second treatment module 20 can include an ultrasonic horn (for example, 114, shown in FIGS. 13A, 13B). This ACAR solution could be also applied, for example, to other continuous applications where the ultrasonic stack or material is traversing, or other applications that do not require a rotating anvil. In this embodiment, the controller 50/200 can use changes in ultrasonic amplitude to control the areas of bonded and unbonded materials, such as, for example, the multilayer nonwoven materials. Using ACAR, the controller 200 can provide distinct control tunings for low/idle amplitude unbonded areas, high amplitude bonded areas, and any transitions between them, to ensure rapid convergence on a regulated state in each stage. When line synchronization to the material is not needed, user settings of bond period, duration, unbonded amplitude target, and bonded amplitude target can be used by the controller 200 to allow the system 100 to function with no external inputs. When synchronization is desirable, the system 100, under control of the controller 200, will react to an external "bond control" signal received by the controller 200. The bond control signal can include either a digital input signal or analog signal representing a target amplitude.

In an embodiment, the controller 50/200 can be configured with ACAR to provide varying amplitude targets for each bond of the treatment operation to account for variations encountered in the plurality of bond force characteristics. For example, the amplitude target for bond X can be 80%, and the amplitude target for bond X+1 can be 90%.

While the above embodiments refer to amplitude, the present disclosure contemplates that instead of using amplitude, the power signal can be used.

Figure 8A:
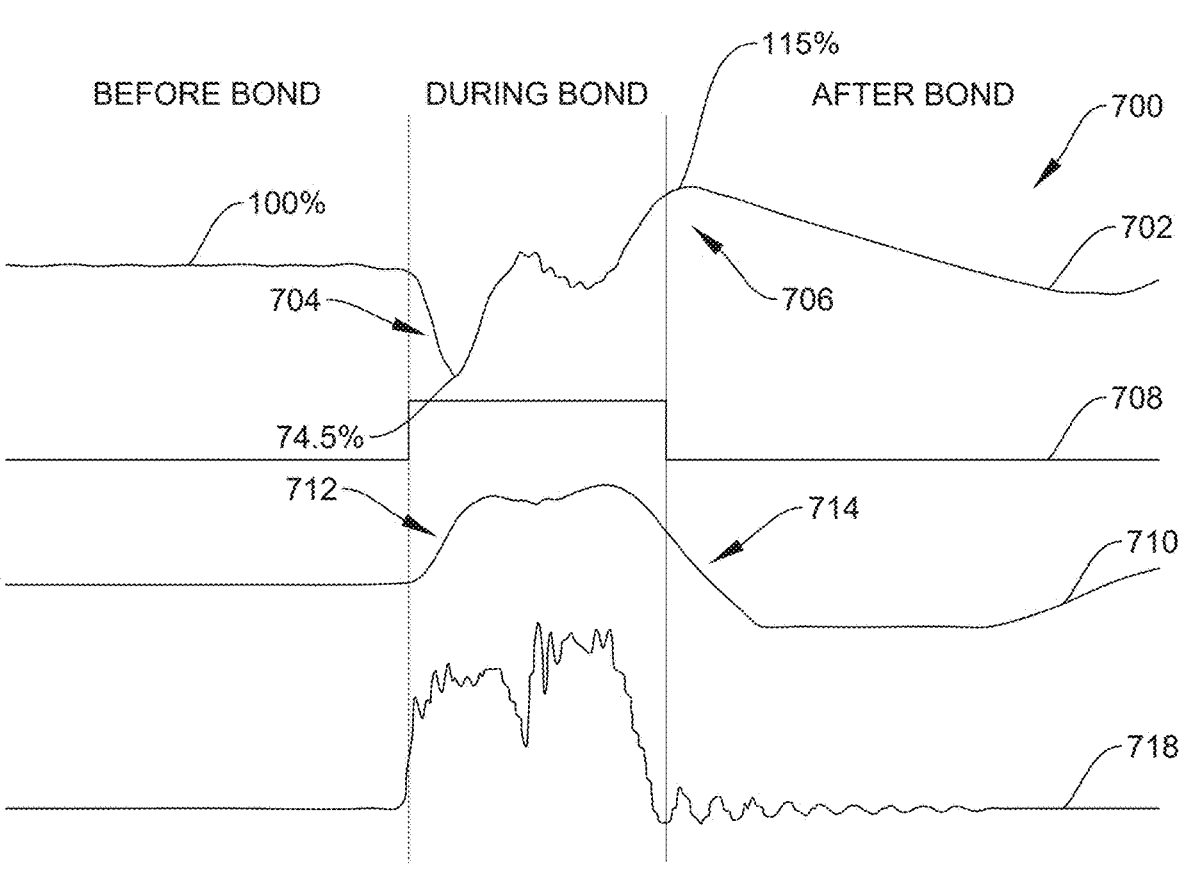
FIG. 8A shows plot diagrams of instantaneous ultrasonic amplitude during an intermittent welding application with a bond duration of 15 mS.

In FIG. 8A, the plot diagrams 700 illustrate instantaneous curves of the ultrasound amplitude 702, bond status 708, ultrasonic excitation energy 710, and force 718, before, during, and after a bond, with a bond duration being, for example, 15 mS, with ACAR disabled. The ultrasonic excitation energy 710 can include a pulse-width, an electronic output effort, or an amplitude regulation control output response. The bond status curve is derived from the force signal 718. The ultrasonic excitation energy 710 represents the relative output effort of the ultrasonic driver in the treatment module 10 (or 20, shown in FIG. 1A), which in the depicted embodiment is a pulse-width. As seen, the amplitude 702 of ultrasonic vibration dips from 100% unloaded (before the bond) to 74.5% during the bond before overshooting to 115%, a 40.6% swing. In various embodiments the bond status 708 includes a square wave pulse during which, for example, the first treatment module 10 and/or the second treatment module 20 (shown in FIG. 1) contact the workpiece 60 to perform a bonding, welding, fusing, and/or cutting operation.

Figure 8B:
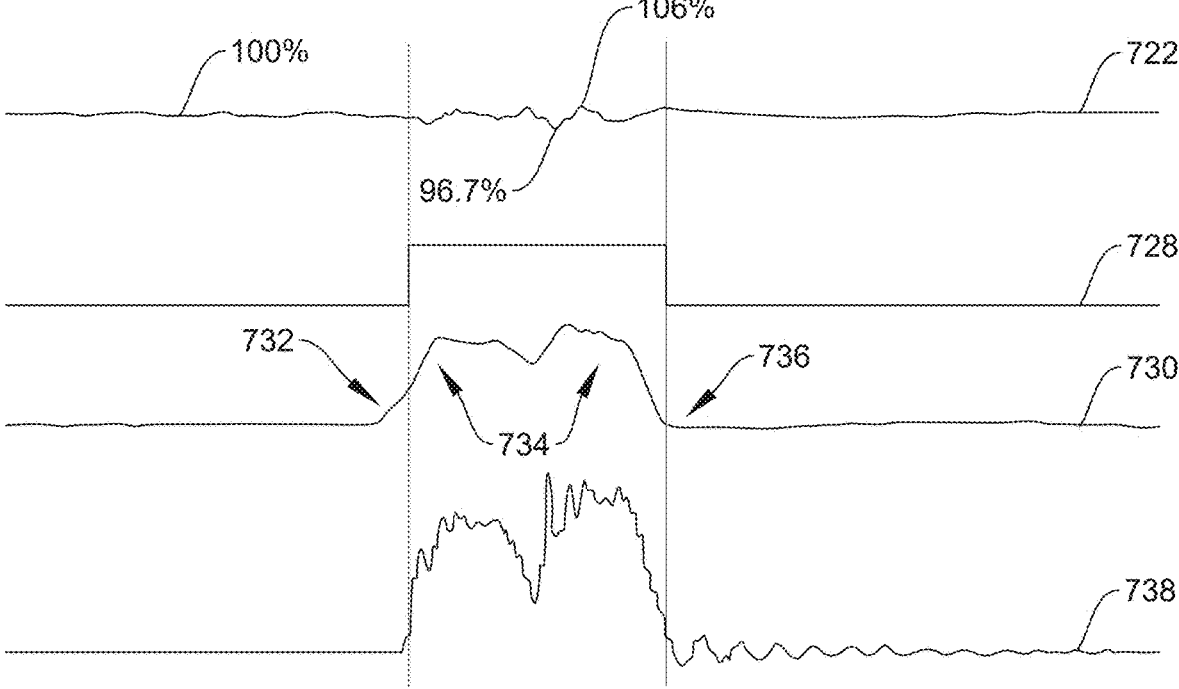
FIG. 8B shows ultrasonic amplitude plot diagrams in which Adaptive Cyclic Amplitude Regulation (ACAR) has been enabled.

By comparison, FIG. 8B illustrates plots 720 in which ACAR has been enabled with dramatic results. Here, the amplitude dips from 100% unloaded to 96.7% with a max of 106%, reducing the range to a 9.3% swing.

With ACAR disabled, the ultrasonic pulse-width is seen to increase, as indicated by 712 in response to the sag in amplitude 704. The traditional PID control builds output level attempting to reduce the error in the amplitude signal. Once the bond has passed and the load/damping to the ultrasonic device 114 is removed, the ultrasonic excitation energy/output energy is now too large, as indicated by 714, and the amplitude responds by rising past the intended operating point 706. With ACAR enabled, the pulse-width is preemptively increased to match the expected load with pre-boost 732 of the pulse-width, adapts throughout the leading and trailing portions of the bond 734, and switches back to idle/no-load regulation 736 after the bond, minimizing the disturbance to amplitude 722.

Because the bond occurs within milliseconds, there is a transient response as the bonds traverse the surface of the welding module, such as, for example, an ultrasonic device 114.

In various embodiments the welding system 100 (or 1 shown in FIG. 1) includes a welding device 114 for treating one or more workpieces 60 under operation of the controller 50/200. The controller 50/200 is arranged to perform an ACAR operation, including: receiving an amplitude signal indicative of a real-time amplitude of ultrasonic vibration of the joining device 114 during a treatment cycle; segmenting the amplitude signal into a plurality of amplitude segments for the treatment cycle; monitoring an amplitude value of each of the plurality of amplitude segments during the treatment cycle; employing a plurality of amplitude segments with individual closed-loop control algorithms to calculate a plurality of amplitude adjustment values, each of the plurality of amplitude adjustment values corresponding to a respective one of the plurality of amplitude segments; and applying each amplitude adjustment value to the corresponding respective one of the plurality of amplitude segments during the subsequent treatment cycle in real-time, thereby applying what is detected on a present bond to the next bond, or subsequent (or next) treatment.

In various embodiments each individual closed-loop control algorithm can include a separate PID tuning loop generated for, and corresponding to, one of the plurality of amplitude segments, such that a plurality of distinct PID tuning loops are generated and employed for corresponding amplitude segments during a single pulse 708/728 (shown in FIGS. 8A, 8B). The treatment cycle comprises treating a single workpiece 60 in a plurality of workpieces 60, and the treating comprises a bonding operation, a welding operation, a soldering operation, a fusing operation, or a cutting operation. The controller 50/200 can be arranged to generate a proportional-integral-derivative (PID) setting for each of the plurality of amplitude segments and apply each PID setting to the respective one of the plurality of amplitude segments. In various embodiments the controller 50/200 includes a PID control module configured to generate a PID setting (for example, optimal PID gain value) for each amplitude segment to regulate an ultrasonic welding process by adjusting the power applied for the corresponding segment based on real-time measurements of, for example, an amplitude signal, a force signal, a power signal, and/or one or more position signals.

The controller 50/200 can be arranged to receive and analyze a force signal from the force sensor and detect a treating cycle rate based on a timing analysis of the force signal. In certain embodiments the controller 50/200 can be configured to receive and analyze the amplitude signal from amplitude sensor, the power signal from a power sensor and one or more position signals from at least one position sensor, any of which can be included, for example, in the sensor module 40 (shown in FIG. 1A). The treating cycle rate comprises a rate (in units-per-minute) at which each workpiece 60 in a plurality of workpieces (60) is treated, wherein the treatment can include a welding operation, a bonding operation, a cutting operation, or other processing of the workpieces 60.

Figure 11A:
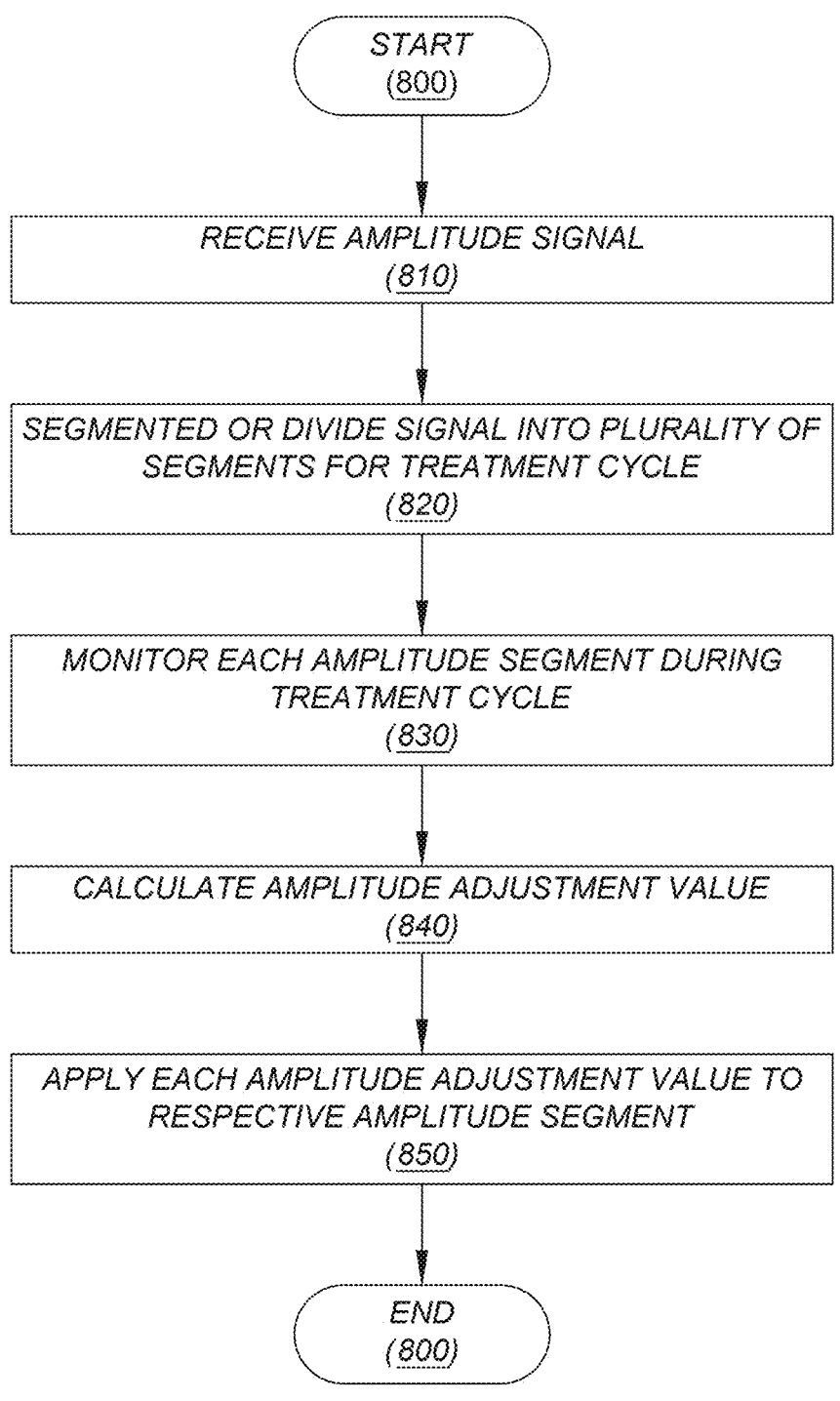
FIGS. 11A and 11B show nonlimiting embodiments of an ACAR process, according to the principles of the disclosure.

FIG. 11A illustrates an embodiment of a process 800 of the welding device 100 (or workstation 1) equipped with ACAR, according to the principles of the disclosure. Referring to FIGS. 11A and 13 together, the controller 200 (or 50) can be arranged to perform the process 800. The controller 200 can receive an amplitude signal indicative of a real-time amplitude of ultrasonic vibration of the welding device 114 during a treatment cycle (Step 810). The received amplitude signal can be divided or segmented (for example, by the processor 210) into a plurality of amplitude segments for the treatment cycle (Step 820). The amplitude value of each amplitude segment of the plurality of amplitude segments can be monitored (for example, by the processor 210) during the treatment cycle (Step 830) and a plurality of real-time amplitude adjustment values determined or calculated by a plurality of closed-loop control algorithms, with each of the plurality of amplitude adjustment values corresponding to a respective one of the plurality of amplitude segments (Step 840). The real-time amplitude adjustment value of each closed-loop control algorithm is based, in part, on historical amplitude response data. Each amplitude adjustment value can be applied to the corresponding respective one of the plurality of amplitude segments during the treatment cycle in real-time (Step 850), thereby applying what is detected on a present bond to the next bond, or subsequent (or next) treatment. The process 800 when performed can reduce amplitude deviations prior to and/or during bonding operations.

Figure 11B:
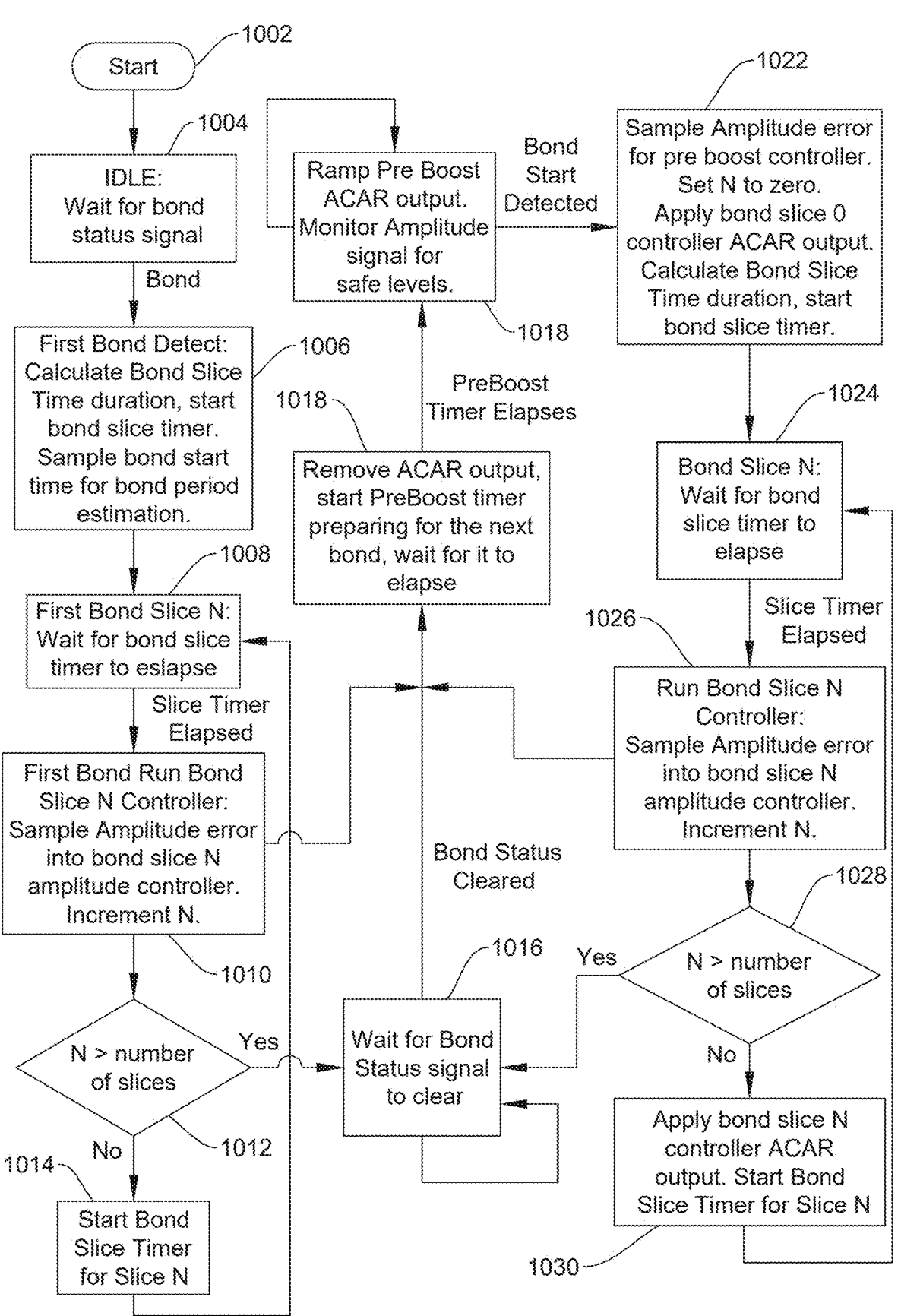

FIG. 11B illustrates an embodiment of a process 1000 of the welding device 100 equipped with ACAR, according to the principles of the disclosure. Referring to FIGS. 11B and 13, the process starts (1002) with an IDLE state in which the controller 200 waits for a bond status signal (1004). In a First Bond Detect state, the bond slice time duration is calculated by the controller 200, and a bond slice timer is started (1006). The bond start time is sampled for bond period estimation by the controller 200 (1006). In a First Bond Slice N Controller state (where N is an integer, such as 1, 2, 3, and so on), the amplitude error is sampled into bond slice N amplitude via the controller 200, and N is incremented (1010).

Unless N exceeds the number of slices (1012), the bond slice timer is started for slice N (1014) and the process 1000 returns to state 1008. Otherwise, the process 1000 waits for the bond status signal to clear (1016), and when it does, the ACAR output is removed, and a pre-boost timer is started by the controller 200 to prepare for the next bond and wait until the timer elapses (1018).

When the pre-boost timer elapses, the pre-boost ACAR output is ramped by the controller 200, and the amplitude signal is monitored for safe levels (1020). When bond start is detected by the controller 200, the amplitude error is sampled for pre-boost, and N is set to 0 by the controller 200 (1022). Bond slice 0 is applied to the controller ACAR output, the bond slice time duration is calculated, and the bond slice timer is started by the controller 200 (1022).

The process 1000 transitions to the Bond Slice N state (1024) and the controller 200 waits for the bond slice timer to elapse (1018). Once the bond slice timer elapses, the process 1000 runs the bond slice N (1026), samples the amplitude error into bond slice N amplitude controller, and increments N via the controller 200 (1026). Unless N exceeds the number of slices (1028), the bond slice N controller ACAR output is applied, and the bond slice timer for slice N is started (1030), and the process 1000 returns to state 1024. If N exceeds the number of slices (1028), the process 1000 moves to state 1016.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The terms "a," "an," and "the," as used in this disclosure, means "one or more," unless expressly specified otherwise.

The terms "communicating device" or "communication device," as used in this disclosure, mean any computing device, hardware, or computing resource that can transmit or receive data packets, instruction signals or data signals over a communication link. The communicating device or communication device can be portable or stationary.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (μC), a central processing unit (CPU), a graphic processing unit (GPU), a data processing unit (DPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The term "computer-readable medium," as used in this disclosure, can mean any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, 5G, or 6G cellular standards, or Bluetooth.

The terms "including," "having," "comprising," and variations thereof, as used in this disclosure, mean "including, but not limited to," unless expressly specified otherwise.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An apparatus having a first treatment module and a second treatment module positionable in proximity to the first treatment module, wherein at least one of the first treatment module and the second treatment module includes a joining device for treating one or more workpieces, the apparatus comprising a controller arranged to: receive an ultrasonic amplitude signal representative of real-time ultrasonic vibration of at least one of the first treatment module and the second treatment module during a treatment cycle; segment the ultrasonic amplitude signal into a plurality of amplitude segments for the treatment cycle; monitor an amplitude value of each of the plurality of amplitude segments during the treatment cycle; operate a closed-loop control algorithm to predict a plurality of amplitude adjustment values, each of the plurality of amplitude adjustment values corresponding to a respective one of a plurality of amplitude segments in a subsequent treatment cycle; and apply each amplitude adjustment value to the corresponding respective one of the plurality of amplitude segments in the subsequent treatment cycle to reduce ultrasonic amplitude sag and amplitude overshoot and adapt to an ultrasonic load during the subsequent treatment cycle, wherein said treatment cycle comprises treating a single workpiece in a plurality of workpieces, and the treating comprises a bonding operation, a welding operation, a soldering operation, a fusing operation, or a cutting operation.

2. The apparatus in claim 1, wherein the joining device comprises an ultrasonic horn.

3. The apparatus in claim 1, wherein the closed-loop control algorithm comprises a separate Proportional-Integral-Derivative (PID) tuning loop corresponding to a respective amplitude segment in the plurality of amplitude segments.

4. The apparatus in claim 1, wherein the controller is further arranged to:
   generate a proportional-integral-derivative (PID) setting for each of the plurality of amplitude segments; and
   apply each PID setting to the respective one of the plurality of amplitude segments.

5. The apparatus in claim 1, wherein the single workpiece includes a continuous web or discrete piece of material, and the controller is configured for closed loop force control to reduce bond quality variability.

6. The apparatus in claim 1, wherein the controller is configured to control power delivery by the joining device to the single workpiece.

7. The apparatus in claim 1, wherein the controller is configured to provide ultrasonic amplitude regulation and control power delivery to the single workpiece by determining a real-time amplitude adjustment based on historical amplitude response to reduce amplitude deviations prior to or during bonding.

8. The apparatus in claim 6, wherein power delivery is controlled to reduce amplitude deviations during bonds by matching ultrasonic regulation control response to individual load characteristics of distinct bonds occurring in rapid succession.

9. The apparatus in claim 1, further comprising:
   a force sensor configured to measure a force applied to at least one of the first treatment module and the second treatment module and output a force signal representative of the applied force;
   an amplitude sensor configured to detect and measure the real-time ultrasonic vibration and output the ultrasonic amplitude signal;
   a power sensor configured to detect and measure real-time power supplied to, or applied by, at least one of the first treatment module and the second treatment module; and
   at least one position sensor configured to detect and measure a real-time position of at least one of the first treatment module and the second treatment module, including a real-time position of the joining device,
   wherein the controller is configured to detect a treating cycle rate based on a timing analysis of at least one of the force signal, the ultrasonic power signal, and the at least one position signal, and wherein the treating cycle rate comprises a rate at which each workpiece in the plurality of workpieces is treated.

10. The apparatus in claim 1, wherein the controller is configured to control the joining device to create a space for a splice in the single workpiece and, after determining a splice move state, pause a bond detection operation.

11. The apparatus in claim 1, wherein the treatment cycle and the subsequent treatment cycle each include a fixed bond duty cycle.

12. The apparatus in claim 11, wherein the treatment cycle is a previous bonding application having the fixed bond duty cycle and the subsequent treatment cycle is a current, real-time bonding operation having the fixed bond duty cycle.

13. The apparatus in claim 1, wherein the controller is configured to automatically adapt to ultrasonic load changes due to line rate changes, target weld force changes, or material changes without user interaction.

14. The apparatus in claim 1, wherein the controller is further configured to automatically adapt to ultrasonic load changes due to line rate changes, target weld force changes, or material changes without user interaction, without any external sensor or machine state information.

15. The apparatus in claim 1, wherein the first treatment module or the second treatment module includes an anvil having a bond pattern with a plurality of contact points per bond.

16. The apparatus in claim 15, wherein the anvil comprises a continuous pattern rotating anvil.

17. The apparatus in claim 1, wherein the joining device includes an energy stack and the controller is configured to increase the ultrasonic amplitude signal during a pre-boost period before the subsequent treatment cycle to counteract loss of momentum in the energy stack.

18. The apparatus in claim 1, wherein the joining device includes an energy stack and the controller is configured to reduce the ultrasonic amplitude signal during a post-boost period, after the subsequent treatment cycle, to reduce or remove excitation energy and allow resonant mechanical inertia to dissipate into the one or more workpieces.

\* \* \* \* \*